(12) United States Patent
Nakai

(10) Patent No.: US 11,822,334 B2
(45) Date of Patent: Nov. 21, 2023

(54) INFORMATION PROCESSING APPARATUS, INFORMATION PROCESSING METHOD, AND PROGRAM FOR CONTROL OF A MOVING BODY CAPABLE OF AUTONOMOUS MOVEMENT

(71) Applicant: Sony Group Corporation, Tokyo (JP)

(72) Inventor: Mikio Nakai, Tokyo (JP)

(73) Assignee: Sony Group Corporation, Tokyo (JP)

( * ) Notice: Subject to any disclaimer, the term of this patent is extended or adjusted under 35 U.S.C. 154(b) by 241 days.

(21) Appl. No.: 17/291,586

(22) PCT Filed: Oct. 30, 2019

(86) PCT No.: PCT/JP2019/042592
§ 371 (c)(1),
(2) Date: May 5, 2021

(87) PCT Pub. No.: WO2020/100595
PCT Pub. Date: May 22, 2020

(65) Prior Publication Data
US 2021/0397191 A1    Dec. 23, 2021

(30) Foreign Application Priority Data
Nov. 12, 2018 (JP) .................. 2018-212207

(51) Int. Cl.
G05D 1/02     (2020.01)
G01C 21/00    (2006.01)
(Continued)

(52) U.S. Cl.
CPC ....... *G05D 1/0214* (2013.01); *G01C 21/3804* (2020.08); *G01C 21/3841* (2020.08);
(Continued)

(58) Field of Classification Search
CPC .. G05D 1/0214; G05D 1/0088; G05D 1/0238; G05D 1/0246; G05D 1/0274;
(Continued)

(56) References Cited

U.S. PATENT DOCUMENTS

2007/0188615 A1    8/2007  Beniyama et al.
2017/0165835 A1    6/2017  Agarwal
(Continued)

FOREIGN PATENT DOCUMENTS

JP    2006-072612 A    3/2006

OTHER PUBLICATIONS

Chakravarty et al.; External Cameras & A Mobile Robot: A Collaborative Surveillance System; Australasian Conference on Robotics and Automation (ACRA), Dec. 2-4, 2009, Sydney, Australia (Year: 2009).*

(Continued)

*Primary Examiner* — Michael J Zanelli
(74) *Attorney, Agent, or Firm* — Wolf, Greenfield & Sacks, P.C.

(57) ABSTRACT

There is provided methods and apparatus for a path planning system. The apparatus comprises a body and a movement device attached thereto, wherein the body comprises a control unit in communication with the movement device, the control unit comprising at least one processor and a memory configured to store instructions. The instructions, when executed by the at least one processor, cause the at least one processor to receive image capture range information for one or more imaging devices located external to the apparatus, calculate a movement path for the apparatus based, at least in part, on the received image capture range information, and control the movement device to move the apparatus in accordance with the calculated movement path.

20 Claims, 10 Drawing Sheets

(51) Int. Cl.
*G06V 20/58* (2022.01)
*G05D 1/00* (2006.01)
(52) U.S. Cl.
CPC ......... *G05D 1/0088* (2013.01); *G05D 1/0238* (2013.01); *G06V 20/58* (2022.01)
(58) Field of Classification Search
CPC ............... G05D 1/028; G01C 21/3804; G01C 21/3841; G06V 20/58
See application file for complete search history.

(56) References Cited

U.S. PATENT DOCUMENTS

| | | | |
|---|---|---|---|
| 2017/0166299 A1 | 6/2017 | Fujimura et al. | |
| 2017/0176999 A1 | 6/2017 | Bobda | |
| 2017/0252925 A1* | 9/2017 | Cho | ........................ G06V 10/42 |
| 2018/0281191 A1* | 10/2018 | Sinyavskiy | .......... G05D 1/0274 |

OTHER PUBLICATIONS

Pizarro et al.; Localization of Mobile Robots Using Odometry and an External Vision Sensor; Sensors 2010, 10, 3655-3680; doi: 10.3390/s100403655 (Year: 2010).*
Ravankar et al.; Intelligent Robot Guidance in Fixed External Camera Network for Navigation in Crowded and Narrow Passages; Proceedings 2017, 1, 37; doi:10.3390/ecsa-3-D008 www.mdpi.com/journal/proceedings (Year: 2017).*
International Search Report and Written Opinion mailed Jan. 20, 2020 in connection with International Application No. PCT/JP2019/042592.

\* cited by examiner

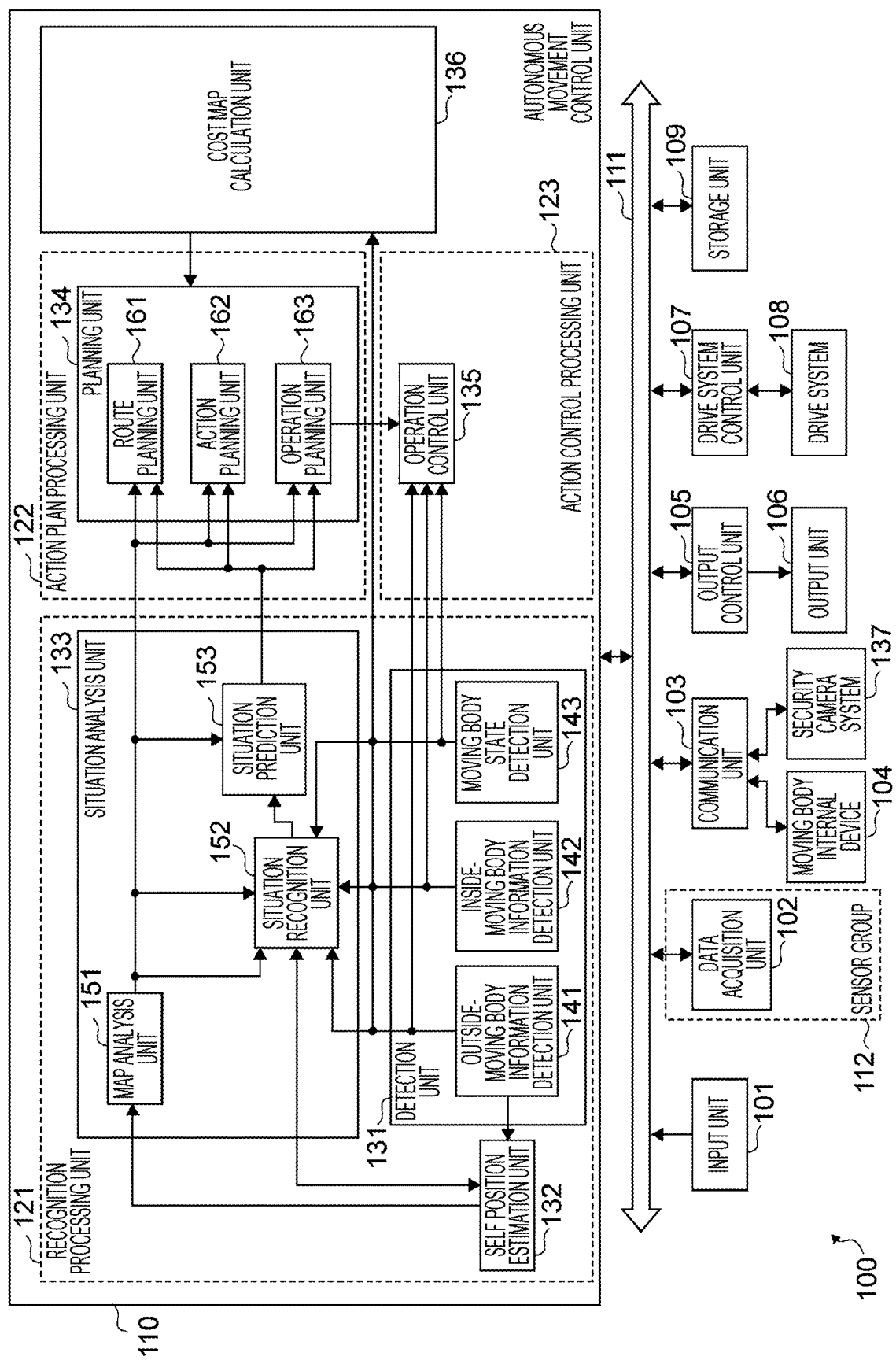
[FIG. 1]

[FIG. 2]
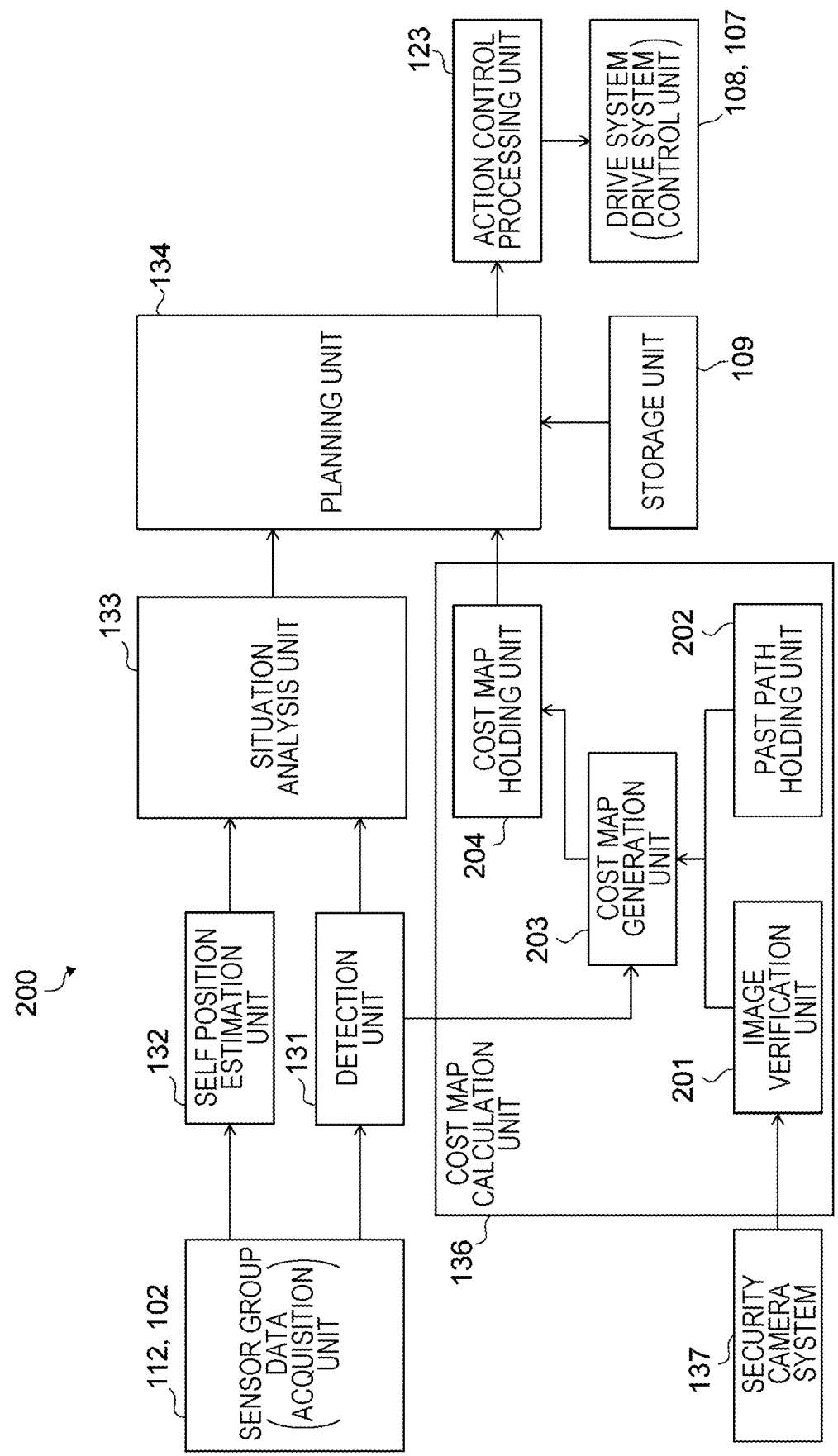

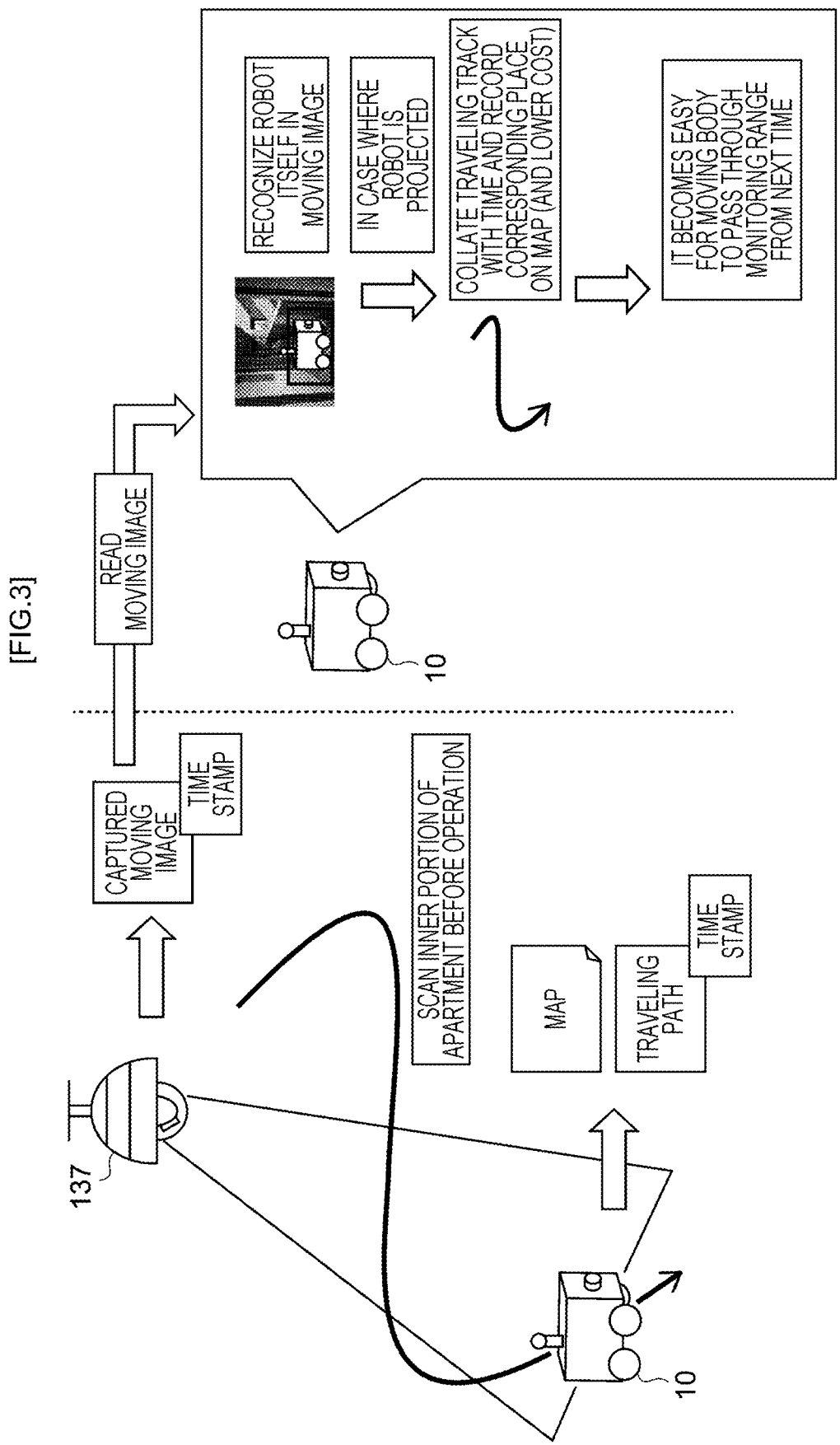
[FIG.3]

[Fig. 4]
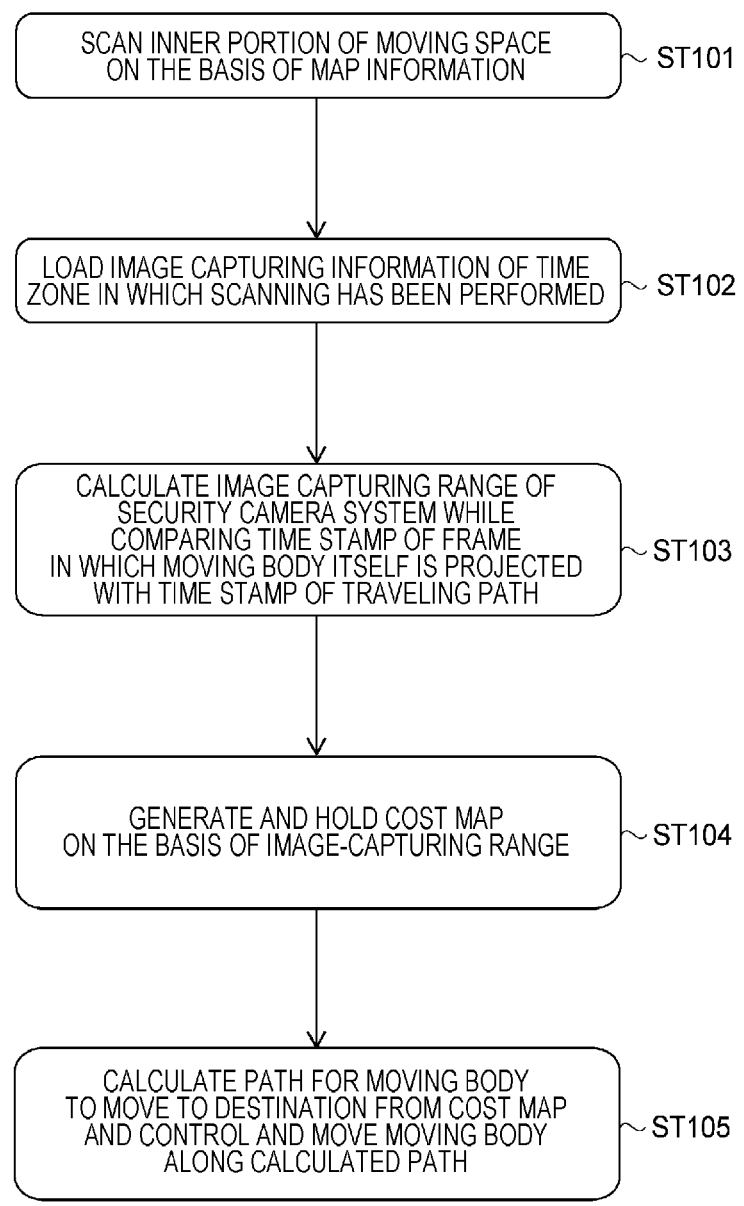

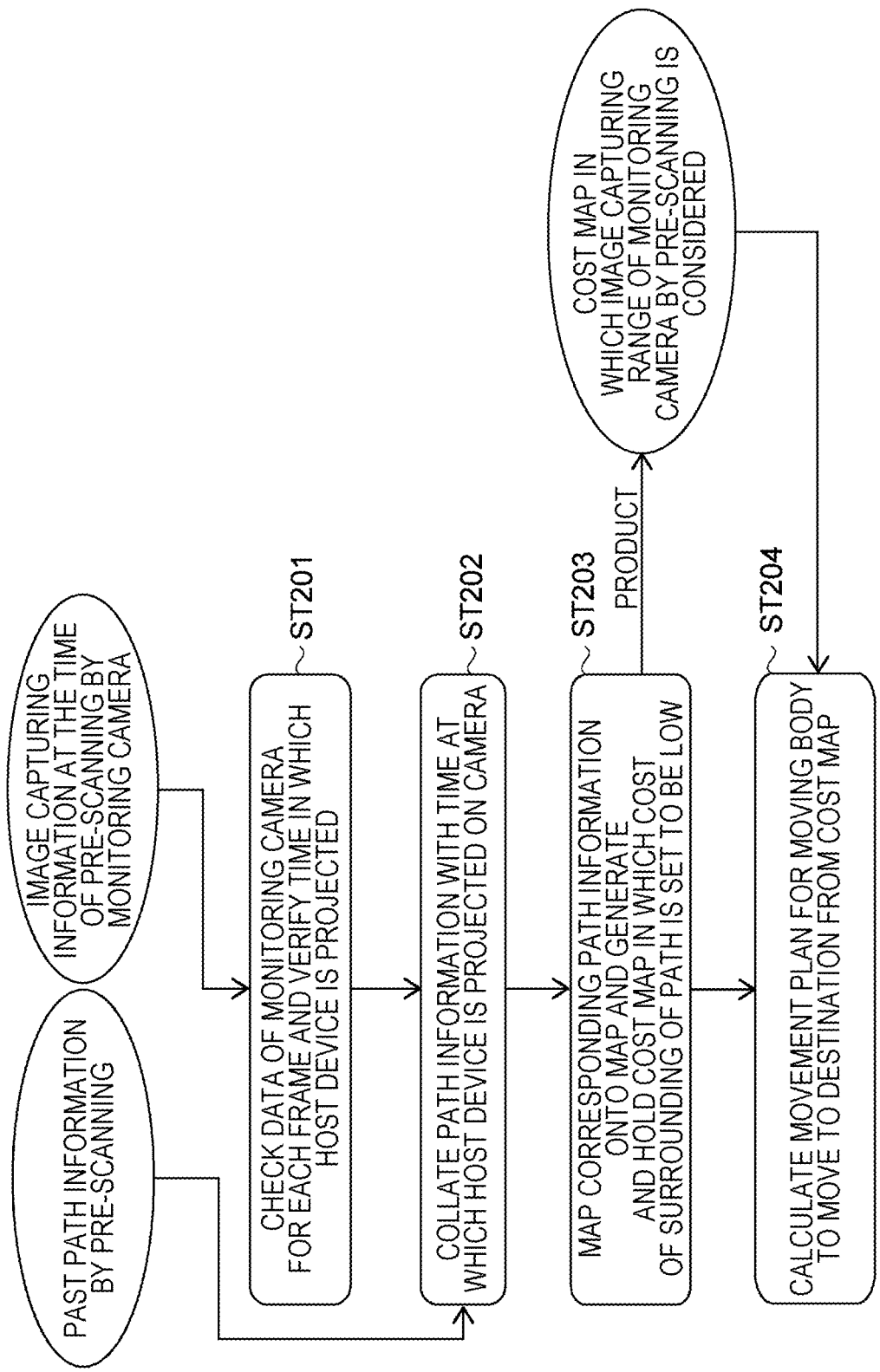

[Fig. 6]
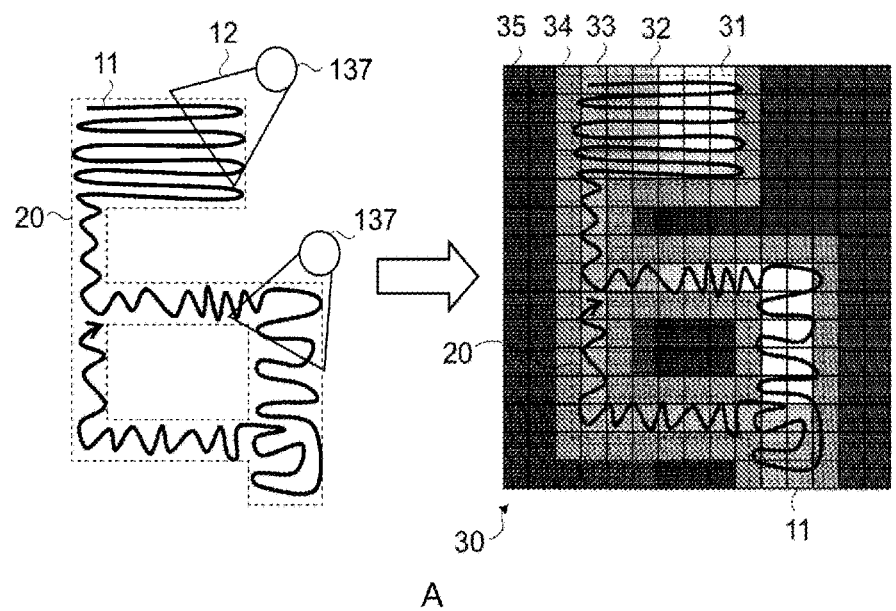
A
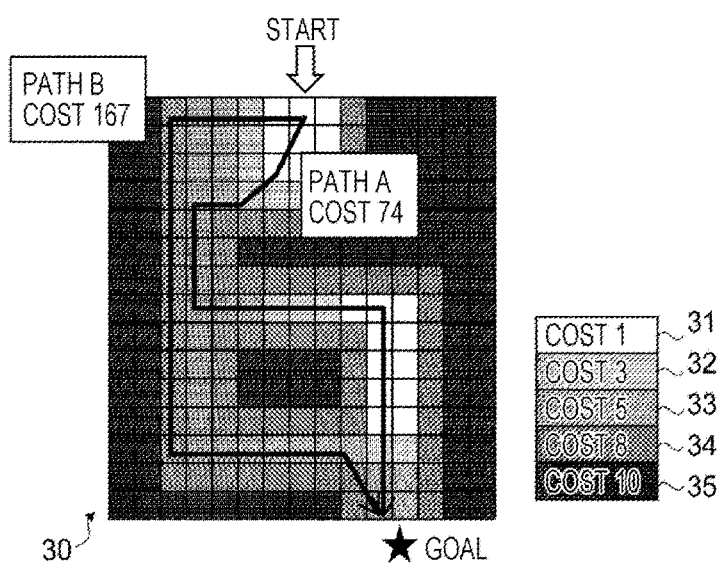
B

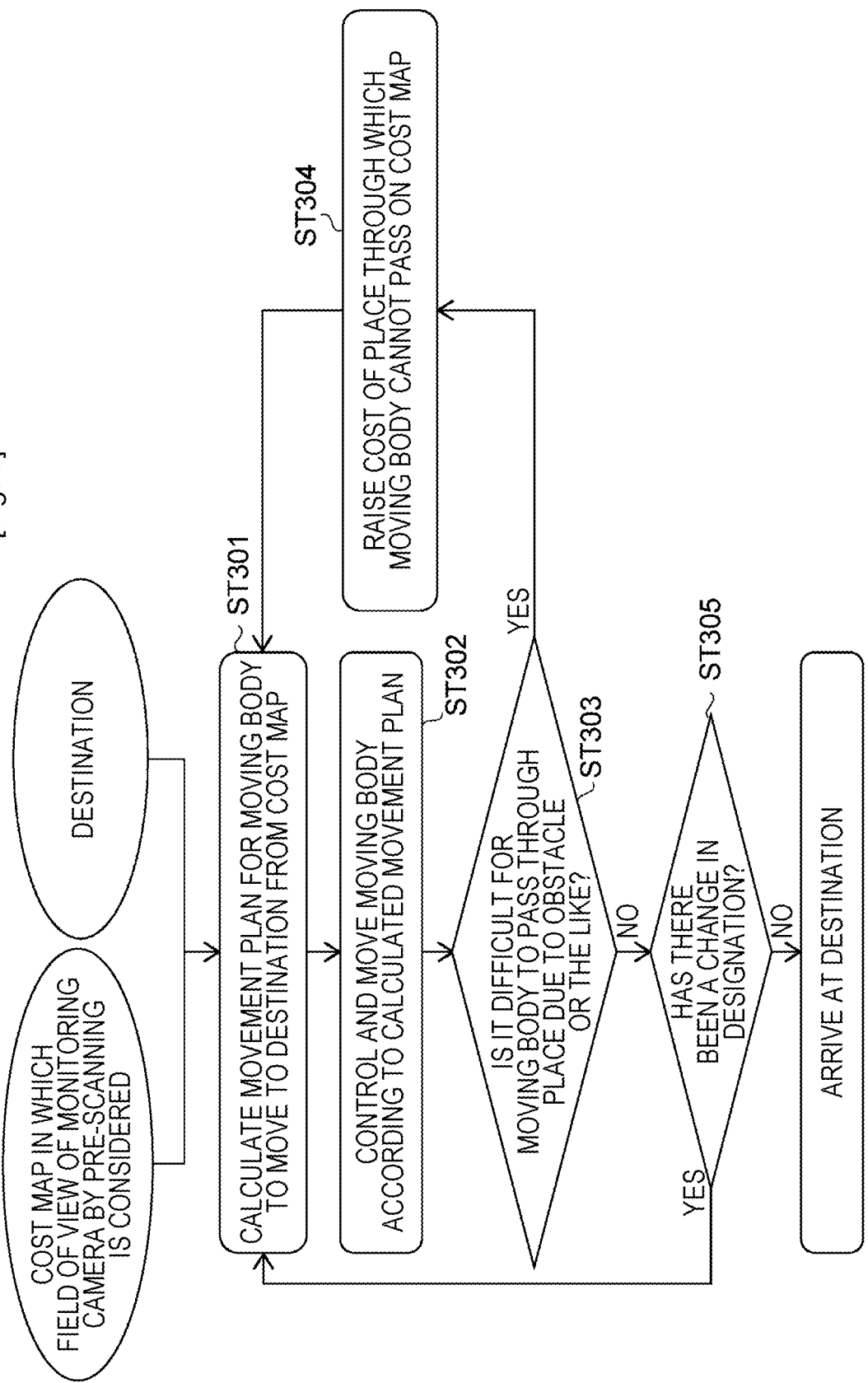

[Fig. 8]
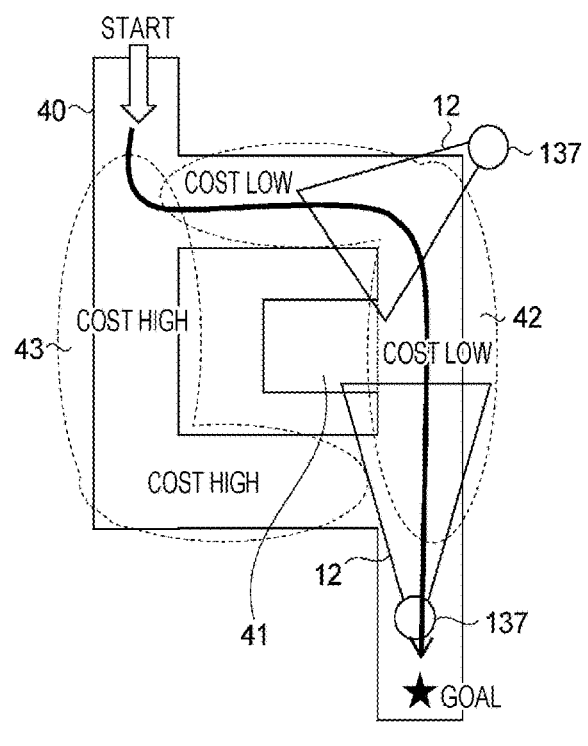
A
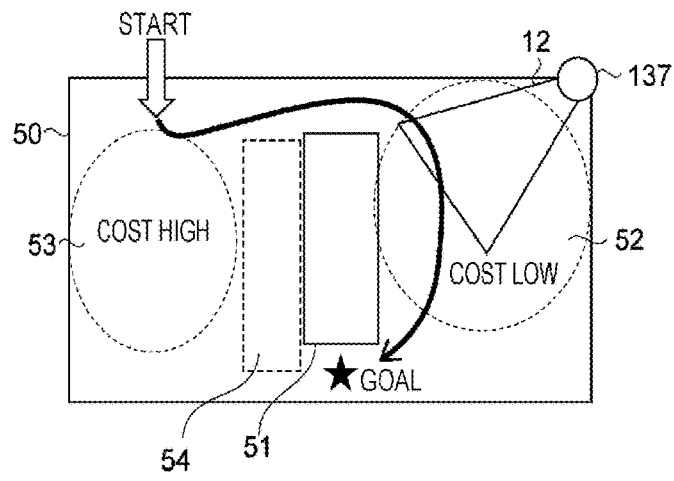
B

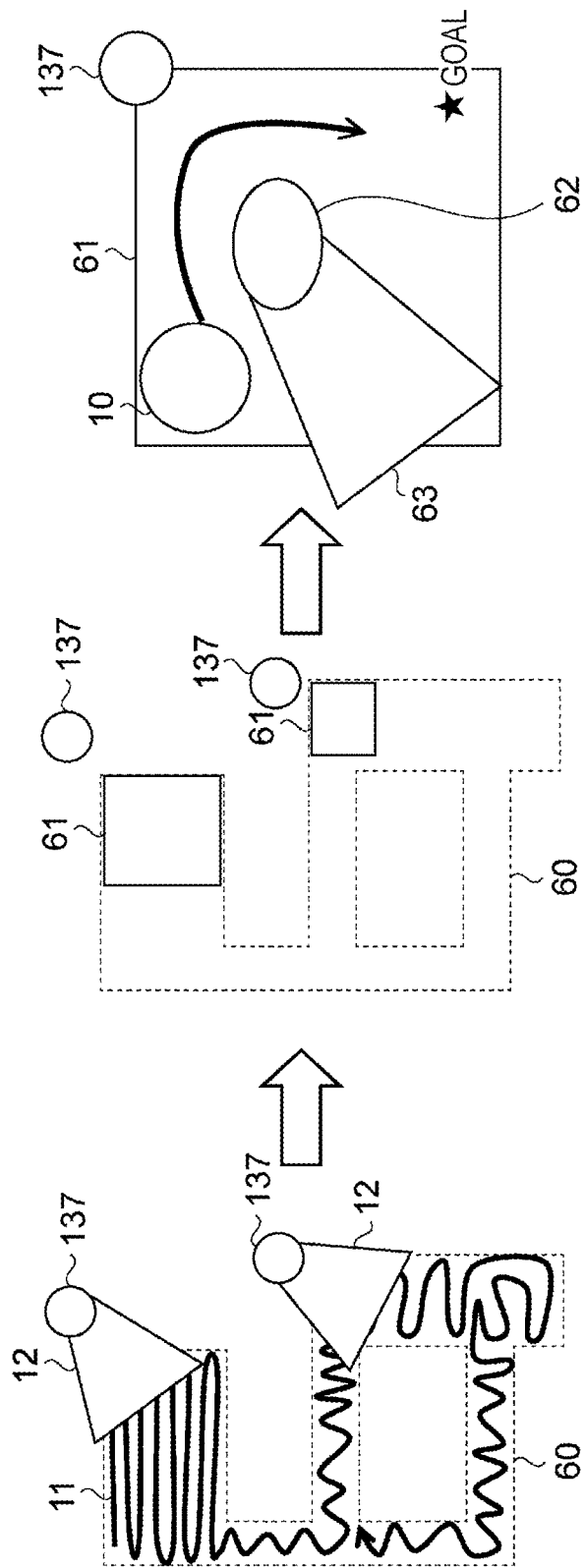

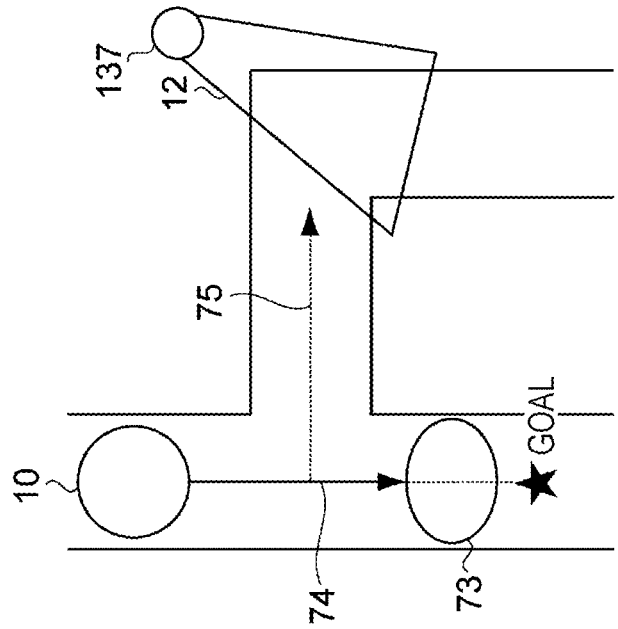
[Fig. 10B]
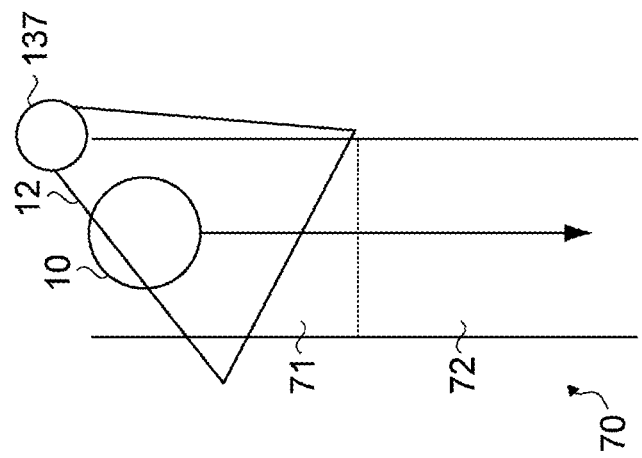
[Fig. 10A]

INFORMATION PROCESSING APPARATUS, INFORMATION PROCESSING METHOD, AND PROGRAM FOR CONTROL OF A MOVING BODY CAPABLE OF AUTONOMOUS MOVEMENT

CROSS-REFERENCE TO RELATED APPLICATIONS

This application claims the benefit under 35 U.S.C. § 371 as a U.S. National Stage Entry of International Application No. PCT/JP2019/042592, filed in the Japanese Patent Office as a Receiving Office on Oct. 30, 2019, which claims priority to Japanese Priority Patent Application Number JP 2018-212207 filed in the Japanese Patent Office on Nov. 12, 2018 Nov. 12, 2018, each of which is hereby incorporated by reference in its entirety.

TECHNICAL FIELD

The present technology relates to an information processing apparatus, an information processing method, and a program that can be applied to the control of a moving body capable of autonomous movement.

BACKGROUND ART

In recent years, moving bodies capable of autonomous movement, such as robots and the like, have been used in various fields. PTL 1 describes a patrol robot that patrols a general house or the like. In this patrol robot, a space to be patrolled includes a plurality of subspaces such as each room and a corridor. Information of a risk of invasion such as opening and closing of a window, or the like, and information of value such as the presence or absence of the storage of money and goods, or the like, are each held as parameters for each subspace. A required retention time rate is determined for each subspace on the basis of the held parameters, and a moving path of the patrol robot is planned on the basis of the determined required retention time rate and geographical information of the space. Therefore, it is intended to effectively reduce the risk of invasion (paragraphs [0018] and [0023], FIG. 5 and the like of PTL 1).

CITATION LIST

Patent Literature

PTL 1: JP 2006-72612A

SUMMARY

Technical Problem

A technology that makes it possible to calculate a movement plan of a moving body capable of such autonomous movement, based on an image capturing range of an external image capturing system such as a monitoring camera or the like, has been demanded.

In view of the circumstance as described above, it is desirable to provide an information processing apparatus, an information processing method, and a program capable of easily creating a movement plan based on an image capturing range of an external image capturing system for a moving body capable of autonomous movement.

Solution to Problem

According to the present disclosure, there is provided an apparatus. The apparatus comprises a body and a movement device attached thereto, wherein the body comprises a control unit in communication with the movement device, the control unit comprising at least one processor and a memory configured to store instructions. The instructions, when executed by the at least one processor, cause the at least processor to receive image capture range information for one or more imaging devices located external to the apparatus; calculate a movement path for the apparatus based, at least in part, on the received image capture range information; and control the movement device to move the apparatus in accordance with the calculated movement path.

According to the present disclosure, there is provided a method. The method comprises receiving image capture range information for one or more imaging devices located external to an apparatus; calculating, by at least one computer processor, a movement path for the apparatus based, at least in part, on the received image capture range information; and controlling a movement device of the apparatus to move the apparatus in accordance with the calculated movement path.

According to the present disclosure, there is provided an apparatus path planning system. The apparatus path planning system comprises one or more imaging devices configured to capture images within a space, wherein each of the one or more imaging devices has an image capture range; and an apparatus. The apparatus comprises a body and a movement device attached thereto, wherein the body comprises a control unit in communication with the movement device, the control unit comprising at least one processor and a memory configured to store instructions. The instructions, when executed by the at least one processor, cause the at least one processor to receive, from the one or more imaging devices, image capture range information describing the image capture range of each of the one or more imaging devices; calculate a movement path for the apparatus based, at least in part, on the received image capture range information; and control the movement device to move the apparatus in accordance with the calculated movement path.

Advantageous Effects of Invention

As described above, according to the present technology, it is possible to easily create a movement plan based on an image capturing range of another image capturing system. Note that an effect described here is not necessarily limited, and may be any effect described in the present disclosure.

BRIEF DESCRIPTION OF DRAWINGS

FIG. 1 is a block diagram illustrating a configuration example of schematic functions of a moving body control system that controls autonomous movement of a moving body according to an embodiment of the present technology.

FIG. 2 is a block diagram illustrating a functional configuration example of a movement planning system calculating a movement plan of the moving body.

FIG. 3 is a view illustrating an outline of movement control of the moving body according to the present embodiment.

FIG. 4 is a flowchart illustrating an example of movement control of the moving body.

FIG. 5 is a flowchart illustrating an example of processing for generating a cost map.

FIGS. 6A and 6B are schematic views for describing processing until the movement plan is calculated.

FIG. 7 is a flowchart illustrating an example of movement to a destination based on the movement plan.

FIGS. 8A and 8B are schematic views illustrating an example of movement according to the movement plan of the moving body.

FIG. 9 is a schematic view illustrating an example of calculation of a blind spot in a case where there is an obstacle in a field of view.

FIGS. 10A and 10B are schematic views illustrating an example of a speed of the moving body and a processing time of update of a movement plan.

DESCRIPTION OF EMBODIMENTS

Hereinafter, embodiments according to the present technology will be described with reference to the drawings.

(Configuration Example of Moving Body Control System)

FIG. 1 is a block diagram illustrating a configuration example of schematic functions of a moving body control system 100 that controls autonomous movement of a moving body 10 according to an embodiment of the present technology. Note that the moving body control system 100 of FIG. 1 is an example of a moving body control system that controls the moving body 10 including a robot to which the present technology can be applied, but can also be applied as a system that controls other moving bodies, for example, a multi-rotor copter (drone) or the like. Furthermore, the robot may be a wheel-type robot or a ridable automatic driving vehicle or may be a multi-legged walking-type robot. Of course, the moving body control system 100 is also applicable to a robot including a leg portion having an articulated structure as a driving unit.

The moving body control system 100 includes an input unit 101, a data acquisition unit 102, a communication unit 103, a moving body internal device 104, an output control unit 105, an output unit 106, a drive system control unit 107, a drive system 108, a storage unit 109, and an autonomous movement control unit 110. The input unit 101, the data acquisition unit 102, the communication unit 103, the output control unit 105, the drive system control unit 107, the storage unit 109, and the autonomous movement control unit 110 are connected to each other a communication network 111. The communication network 111 is, for example, a communication network or a bus according to an arbitrary standard such as a controller area network (CAN), a local interconnect network (LIN), a local area network (LAN) such as IEEE 802.3, or FlexRay (registered trademark), a unique communication manner that is not standardized, or the like. Note that the respective units of the moving body control system 100 are not connected to each other through the communication network 111, and may be directly connected to each other.

Note that, hereinafter, in a case where the respective units of the moving body control system 100 perform communication with each other through the communication network 111, a description of the communication network 111 will be omitted. For example, in a case where the input unit 101 and the autonomous movement control unit 110 perform communication with each other through the communication network 111, it will be simply described that the input unit 101 and the autonomous movement control unit 110 perform communication with each other.

The input unit 101 includes a device used to input various data, instructions or the like. For example, the input unit 101 includes operation devices such as a touch panel, a button, a microphone, a switch, a lever, and the like, and an operation device and the like that can perform input by a method other than a manual operation by a voice, a gesture or the like. Furthermore, for example, the input unit 101 may be a remote control device using infrared rays or other radio waves, or an external connection device such as a mobile device, wearable device or the like corresponding to an operation of the moving body control system 100. The input unit 101 generates an input signal on the basis of input data, instruction, or the like, and supplies the generated input signal to each unit of the moving body control system 100.

The data acquisition unit 102 includes various sensors or the like acquiring data used for processing of the moving body control system 100, and supplies the acquired data to each unit of the moving body control system 100. For example, the data acquisition unit 102 configures a sensor group 112 by including various sensors for detecting a state or the like of the moving body 10.

Specifically, for example, the data acquisition unit 102 includes a geomagnetic sensor detecting a direction, a gyro sensor, an acceleration sensor, sensors for detecting an operation amount of acceleration input such as an accelerator or the like, an operation amount of deceleration input, an operation amount of direction indication input, revolutions per minute or input and output energy and an fuel amount of a driving device such as an engine, a motor or the like, a torque amount of the engine, the motor or the like, a rotation speed and a torque of a wheel, a joint or the like, and the like.

Furthermore, for example, the data acquisition unit 102 includes various sensors for detecting information outside the moving body 10. Specifically, for example, the data acquisition unit 102 includes an image capturing device such as a time of flight (ToF) camera, a stereo camera, a monocular camera, an infrared camera, a polarization camera, other cameras, and the like. Furthermore, for example, the data acquisition unit 102 includes an environment sensor for detecting weather, atmospheric phenomena or the like, and a surrounding information detection sensor for detecting an object around the moving body 10. The environment sensor includes, for example, a temperature sensor, a humidity sensor, a raindrop sensor, a fog sensor, a sunshine sensor, a snow sensor, and the like. The surrounding information detection sensor includes, for example, a laser distance measurement sensor, a contact sensor, an ultrasonic sensor, a radar, a light detection and ranging or a laser imaging detection and ranging (LiDAR), a sonar, and the like.

Furthermore, for example, the data acquisition unit 102 includes various sensors for detecting a current position of the moving body 10. Specifically, for example, the data acquisition unit 102 includes a global navigation satellite system (GNSS) receiver or the like receiving a GNSS signal from a GNSS.

The communication unit 103 performs communication with the moving body internal device 104 and various devices outside the moving body, a server, a base station, and the like, and transmits data supplied from each unit of the moving body control system 100 or supplies received data to each unit of the moving body control system 100. Note that a communication protocol supported by the communication unit 103 is not particularly limited, and the communication unit 103 can also support a plurality of types of communication protocols.

For example, the communication unit 103 performs wireless communication with the moving body internal device 104 by wireless LAN, Bluetooth (registered trademark), near field communication (NFC), a wireless universal serial bus (WUSB), or the like. Furthermore, for example, the communication unit 103 performs wired communication with the moving body internal device 104 by a universal serial bus (USB), a high-definition multimedia interface (HDMI), a mobile high-definition link (MHL), or the like, through a connection terminal (not illustrated) (and a cable if necessary).

Moreover, for example, the communication unit 103 performs communication with an apparatus (for example, an application server or control server) existing on an external network (for example, the Internet, a cloud network, or a network unique to an operator) through a base station or an access point. Furthermore, for example, the communication unit 103 performs communication with a terminal (for example, a terminal of a pedestrian or a shop or a machine type communication (MTC) terminal) existing in the vicinity of the moving body 10 using a peer to peer (P2P) technology. Furthermore, for example, the communication unit 103 includes a beacon receiving unit to receive a radio wave or an electromagnetic wave transmitted from a wireless station or the like and acquire information such as a current position, a required time or the like.

The moving body internal device 104 includes, for example, a mobile device or wearable device possessed by a user, an information device carried in or attached to the moving body 10, a navigation device for searching for a path to an arbitrary destination, and the like.

As illustrated in FIG. 1, in the present embodiment, the communication unit 103 is communicably connected to a security camera system 137 configured outside the moving body. A connection form between the communication unit 103 and the security camera system 137 is not limited, and various connection forms exemplified above may be adopted.

The output control unit 105 controls output of various types of information to the outside of the moving body 10. For example, the output control unit 105 generates an output signal including at least one of visual information (for example, image data) or auditory information (for example, audio data), and supplies the generated output signal to the output unit 106 to control the output of the visual information and the auditory information from the output unit 106. Specifically, for example, the output control unit 105 combines image data captured by different image capturing devices of the data acquisition unit 102 with each other to generate an overhead image or a panoramic image, and supplies an output signal including the generated image to the output unit 106. Furthermore, for example, the output control unit 105 generates audio data including a warning sound, a warning message or the like for danger such as collision, contact, entry into a danger zone, or the like, and supplies an output signal including the generated audio data to the output unit 106.

The output unit 106 includes a device capable of outputting the visual information or the auditory information to the outside of the moving body 10. For example, the output unit 106 includes a display device, an instrument panel, an audio speaker, a projector, a lamp, and the like. The display device included in the output unit 106 is not limited to a device having a normal display. Note that the output control unit 105 and the output unit 106 may be omitted, if necessary, because they are not essential components for processing of autonomous movement.

The drive system control unit 107 controls the drive system 108 by generating various control signals and supplying the generated control signals to the drive system 108. Furthermore, the drive system control unit 107 supplies a control signal to each unit other than the drive system 108, as necessary, to perform notification of a control state of the drive system 108, or the like.

The drive system 108 includes various devices related to a driving system of the moving body 10. For example, the drive system 108 includes a servomotor capable of specifying an angle or a torque provided at each joint of four legs, a motion controller decomposing and replacing a motion of movement of the robot itself into and with motions of the four legs, and a feedback control device by sensors in each motor and sensors on a sole surface.

In another example, the drive system 108 includes motors with four or six propellers on an airframe, and a motion controller decomposing and replacing a motion of movement of the robot itself into and with a rotation amount of each motor.

Moreover, in another example, the drive system 108 includes a driving force generating device for generating a driving force, such as an internal combustion engine, a driving motor or the like, a driving force transmission mechanism for transmitting the driving force to wheels, a steering mechanism adjusting a steering angle, a braking device generating a braking force, an antilock brake system (ABS), an electronic stability control (ESC), an electric power steering device, and the like.

The storage unit 109 includes, for example, a read only memory (ROM), a random access memory (RAM), a magnetic storage device such as a hard disc drive (HDD), a semiconductor storage device, an optical storage device, a magneto-optical storage device, and the like. The storage unit 109 stores various programs, data, and the like used by each unit of the moving body control system 100. For example, the storage unit 109 stores map data such as a three-dimensional high-accuracy map such as a dynamic map or the like, a global map having a lower accuracy than the high-accuracy map and covering a wide area, a local map including information of the surrounding of the moving body 10, and the like.

The autonomous movement control unit 110 performs control regarding autonomous movement. Specifically, for example, the autonomous movement control unit 110 performs cooperation control for the purpose of realizing a function of collision avoidance or shock mitigation of the moving body 10, following movement based on a distance between moving bodies, speed maintaining movement of the moving body, or collision warning of the moving body 10. Furthermore, for example, the autonomous movement control unit 110 performs cooperative control for the purpose of autonomous movement or the like in which the moving body autonomously moves without relying on an operation from the outside.

The autonomous movement control unit 110 has hardware required for a computer, such as, for example, a CPU, a RAM, a ROM, and the like. An information processing method according to the present technology is executed by causing the CPU to load a program according to the present technology stored in advance in the ROM into the RAM and execute the program.

A specific configuration of the autonomous movement control unit 110 is not limited, and devices such as a programmable logic device (PLD) such as a field programmable gate array (FPGA) or the like or other devices such as an application specific integrated circuit (ASIC) and the like may be used.

As illustrated in FIG. 1, the autonomous movement control unit 110 includes a detection unit 131, a self position estimation unit 132, a situation analysis unit 133, a planning unit 134, an operation control unit 135, and a cost map calculation unit 136. Among them, the detection unit 131, the self position estimation unit 132, and the situation analysis unit 133 configure a recognition processing unit 121. Furthermore, the planning unit 134 also configures an action plan processing unit 122. Moreover, the operation control unit 135 configures an action control processing unit 123.

The detection unit 131 detects various types of information required for controlling the autonomous movement of the moving body 10. The detection unit 131 includes an outside-moving body information detection unit 141, an inside-moving body information detection unit 142, and a moving body state detection unit 143.

The outside-moving body information detection unit 141 performs detection processing of information outside the moving body 10 on the basis of data or signals from each unit of the moving body control system 100. For example, the outside-moving body information detection unit 141 performs detection processing, recognition processing, and tracking processing of an object around the moving body 10, and detection processing of a distance to the object. The object to be detected includes, for example, a moving body, a person, an obstacle, a structure, and the like. Furthermore, for example, the outside-moving body information detection unit 141 performs detection processing of a surrounding environment of the moving body 10. The surrounding environment to be detected includes, for example, weather, temperature, humidity, brightness, a state of a road surface, and the like. The outside-moving body information detection unit 141 supplies data indicating a result of the detection processing to the self position estimation unit 132, a map analysis unit 151 and a situation recognition unit 152 of the situation analysis unit 133, the operation control unit 135, the cost map calculation unit 136, and the like.

The inside-moving body information detection unit 142 performs detection processing of information inside the moving body on the basis of data or signals from each unit of the moving body control system 100. For example, the inside-moving body information detection unit 142 performs detection processing or the like of an environment inside the moving body. The inside-moving body information detection unit 142 supplies data indicating a result of the detection processing to the situation recognition unit 152 of the situation analysis unit 133, the operation control unit 135, the cost map calculation unit 136, and the like.

The moving body state detection unit 143 performs detection processing of a state of the moving body 10 on the basis of data or signals from each unit of the moving body control system 100. The state of the moving body 10 to be detected includes, for example, a speed, an acceleration, the presence or absence and a content of abnormality, states of other moving body mounted devices, and the like. The moving body state detection unit 143 supplies data indicating a result of the detection processing to the situation recognition unit 152 of the situation analysis unit 133, the operation control unit 135, the cost map calculation unit 136, and the like.

The self position estimation unit 132 performs estimation processing of a position, an attitude and the like of the moving body 10 on the basis of data or signals from each unit of the moving body control system 100 such as the outside-moving body information detection unit 141, the situation recognition unit 152 of the situation analysis unit 133, and the like. Furthermore, the self position estimation unit 132 generates a local map (hereinafter, referred to as a self position estimation map) used to estimate a self position, as necessary. The self position estimation map is, for example, a highly accurate map using a technology such as simultaneous localization and mapping (SLAM). The self position estimation unit 132 supplies data indicating a result of the estimation process to the map analysis unit 151, the situation recognition unit 152 and the like of the situation analysis unit 133. Furthermore, the self position estimation unit 132 stores the self position estimation map in the storage unit 109.

Moreover, the self position estimation unit 132 accumulates time-series information supplied in time-series in a database on the basis of a detection result supplied from the sensor group 112, estimates the self position on the basis of the time-series information at the time of being accumulated, outputs the estimated self position as a time-series information self position. Furthermore, the self position estimation unit 132 estimates the self position on the basis of a current detection result supplied from the sensor group 112, and outputs the estimated self position as a current information self position. Then, the self position estimation unit 132 integrates or switches the time-series information self position and the current information self position, and outputs a result of the integration or the switching as a self position estimation result. Moreover, the self position estimation unit 132 detects the attitude of the moving body 10 on the basis of the detection result supplied from the sensor group 112, and estimates the self position only from the current information self position when a change in the attitude is detected, such that the self position is greatly changed and it is considered that estimation accuracy of the time-series information self position is decreased. Furthermore, for example, in a case where the moving body 10 moves in a state of being mounted on another moving body, the self position estimation unit 132 considers that estimation accuracy of the time-series information self position is decreased because the self position is greatly changed even though the change in the attitude of the moving body 10 is not detected on the basis of the detection result supplied from the sensor group 112, and estimates the self position only from the current information self position. This case can be considered as, for example, a case where the moving body moves in a state of being mounted on a car ferry boat. In this way, regardless of the presence or absence of an influence of an external force, even when there is a change in the attitude that cannot be predicted in advance, such that the self position is greatly changed, the self position can be estimated from only the current information self position, and it is thus possible to estimate the self position with a certain accuracy.

The situation analysis unit 133 performs analysis processing of situations of the moving body 10 and around the moving body 10. The situation analysis unit 133 includes the map analysis unit 151, the situation recognition unit 152, and a situation prediction unit 153.

The map analysis unit 151 performs analysis processing of various maps stored in the storage unit 109 while using data or signals from each unit of the moving body control system 100 such as the self position estimation unit 132, the outside-moving body information detection unit 141 and the like, as necessary, and constructs a map including information required for processing of the autonomous movement. The map analysis unit 151 supplies the constructed map to the situation recognition unit 152, the situation prediction unit 153, a route planning unit 161, an action planning unit 162, an operation planning unit 163 of the planning unit 134, and the like.

The situation recognition unit 152 performs recognition processing of a situation regarding the moving body 10 on the basis of data or signals from each unit of the moving body control system 100 such as the self position estimation unit 132, the outside-moving body information detection unit 141, the inside-moving body information detection unit 142, the moving body state detection unit 143, the map analysis unit 151, and the like. For example, the situation recognition unit 152 performs recognition processing of the situation of the moving body 10, the situation around the moving body 10, and the like. Furthermore, the situation recognition unit 152 generates a local map (hereinafter, referred to as a situation recognition map) used to recognize the situation around the moving body 10, as necessary. The situation recognition map is, for example, an occupancy grid map, a lane map, or a point cloud map.

The situation of the moving body 10 to be recognized includes, for example, a position, an attitude, and a motion (for example, a speed, an acceleration, a moving direction, or the like) of the moving body 10, and the presence or absence and a content of abnormality. The situation around the moving body 10 to be recognized include, for example, a type and a position of a stationary object around the moving body 10, a type, a position and a motion (for example, a speed, an acceleration, a moving direction, or the like) of a moving object around the moving body, a configuration of a lane around the moving body 10 and a state of a road surface of the lane, and weather, temperature, humidity, brightness, and the like, around the moving body 10.

The situation recognition unit 152 supplies data (including the situation recognition map as necessary) indicating a result of the recognition process to the self position estimation unit 132, the situation prediction unit 153, and the like. Furthermore, the situation recognition unit 152 stores the situation recognition map in the storage unit 109.

The situation prediction unit 153 performs prediction processing of a situation regarding the moving body 10 on the basis of data or signals from each unit of the moving body control system 100 such as the map analysis unit 151, the situation recognition unit 152 and the like. For example, the situation prediction unit 153 performs prediction processing of the situation of the moving body 10, the situation around the moving body 10, and the like.

The situation of the moving body to be predicted includes, for example, behavior of the moving body, occurrence of abnormality, a movable distance, and the like. The situation around the moving body to be predicted includes, for example, behavior of a moving object around the moving body, a change in a state of a signal, and a change in an environment such as weather or the like, and the like.

The situation prediction unit 153 supplies data indicating a result of the prediction process, together with the data from the situation recognition unit 152, to the route planning unit 161, the action planning unit 162, the operation planning unit 163, and the like, of the planning unit 134.

The route planning unit 161 plans a route to a destination on the basis of data or signals from each unit of the moving body control system 100 such as the map analysis unit 151, the situation prediction unit 153 and the like. For example, the route planning unit 161 sets a route from a current position to a specified destination on the basis of the global map. Furthermore, for example, the route planning unit 161 changes an appropriate route on the basis of a situation of a person, an obstacle, construction, and the like. The route planning unit 161 supplies data indicating the planned route to the action planning unit 162 and the like.

The action planning unit 162 plans an action of the moving body 10 for safely moving along the route planned by the route planning unit 161 within a planned time on the basis of data or signals from each unit of the moving body control system 100 such as the map analysis unit 151, the situation prediction unit 153 and the like. For example, the action planning unit 162 performs planning of start, stop, a traveling direction (for example, a forward movement, a backward movement, a left turn, a right turn, a change of direction, or the like), a movement speed, and the like. The action planning unit 162 supplies data indicating the planned action of the moving body 10 to the operation planning unit 163 and the like.

In more detail, the action planning unit 162 generates a candidate of an action plan (movement plan) of the moving body 10 for safely moving within a planned time as action plan candidate for each of the routes planned by the route planning unit 161. More specifically, the action planning unit 162 generates the action plan candidate by, for example, an A*algorithm (A star search algorithm) that divides an environment into a grid shape, and optimizes arrival determination and a weight of a path to generate the best path, a Dijkstra's algorithm (Dijkstra method) that finds the shortest path between two vertices on a graph, a rapidly-exploring random tree (RRT) algorithm that extends paths from a self position to places that can be incrementally reached, and the like, while appropriately pruning the paths.

The operation planning unit 163 plans an operation of the moving body 10 for realizing the action planned by the action planning unit 162 on the basis of data or signals from each unit of the moving body control system 100 such as the map analysis unit 151, the situation prediction unit 153, and the like. For example, the operation planning unit 163 performs planning of acceleration, deceleration, a moving track, and the like. The operation planning unit 163 supplies data indicating the planned operation of the moving body 10 to the operation control unit 135 and the like.

The operation control unit 135 controls the operation of the moving body 10.

In more detail, the operation control unit 135 performs detection processing of an emergency such as collision, contact, entry into a danger zone, abnormality of the moving body 10, or the like, on the basis of detection results of the outside-moving body information detection unit 141, the inside-moving body information detection unit 142, and the moving body state detection unit 143. The operation control unit 135 plans an operation of the moving body 10 for avoiding an emergency such as a sudden stop, a quick turn or the like in a case where it detects occurrence of the emergency.

Furthermore, the operation control unit 135 performs acceleration or deceleration control for realizing the operation of the moving body 10 planned by the operation planning unit 163. For example, the operation control unit 135 calculates a control target value of a driving force generating device or a braking device for realizing planned acceleration, deceleration, or sudden stop, and supplies a control command indicating the calculated control target value to the drive system control unit 107.

The operation control unit 135 performs direction control for realizing the operation of the moving body 10 planned by the operation planning unit 163. For example, the operation control unit 135 calculates a control target value of a steering mechanism for realizing a moving track or a quick turn planned by the operation planning unit 163, and supplies a control command indicating the calculated control target value to the drive system control unit 107.

The cost map calculation unit 136 calculates a cost map used to calculate an action plan (movement plan) on the basis of data or signals from each unit of the moving body control system 100 such as the detection unit 131 and the like. In the present embodiment, the cost map is calculated on the basis of path information regarding the path of the moving body 10 and image capturing information including a captured image captured by the security camera system 137 externally configured.

The security camera system 137 is an image capturing system capable of capturing an image of a predetermined space in which the moving body 10 including the robot to which the moving body control system 100 can be applied moves. Examples of the predetermined space in which the moving body 10 moves include an indoor space such as a space in a site of an apartment or a house, or the like. Alternatively, examples of the predetermined space can include an outdoor space such as a garden or a parking lot.

The present technology is applicable to any space in which the moving body is movable and the image capturing system capable of capturing an image of at least a part of the moving space of the moving body can be constructed. Note that a specific structure of the security camera system 137 is not limited, and may be arbitrarily configured.

In the present embodiment, data in which the captured image captured by the security camera system 137 and an image capturing time at which the captured image is captured are linked to each other is acquired as image capturing information by the communication unit 103.

In the present embodiment, the cost map corresponds to plan information regarding the movement plan of the moving body 10. The plan information can also be said to be information for calculating the movement plan of the moving body 10. Furthermore, the cost map corresponds to cost information regarding the movement of the moving body 10.

FIG. 2 is a block diagram illustrating a functional configuration example of a movement planning system 200 calculating a movement plan of the moving body 10. The movement planning system 200 is configured in the moving body control system 100 in FIG. 1. The movement planning system 200 can be said to be a system that focuses on a calculation function of a movement plan in the moving body control system 100.

The movement planning system 200 includes a sensor group 112 (data acquisition unit 102), a detection unit 131, a self position estimation unit 132, a situation analysis unit 133, a planning unit 134, a cost map calculation unit 136, a storage unit 109, an action control processing unit 123, and a drive system 108 (drive system control unit 107).

As illustrated in FIG. 2, the detection unit 131 and the self position estimation unit 132 perform detection of various types of information required for controlling autonomous movement of the moving body 10 and estimation of a self position, respectively, from information acquired by the sensor group 112. Note that a method of estimating the self position of the moving body 10 is not limited. For example, odometry or the like that estimates a current position from a rotation angle of a tire of the moving body 10 may be used.

The situation analysis unit 133 performs analysis processing of situations of the moving body 10 and around the moving body 10 from various types of information of the moving body 10 detected by the detection unit 131 and the self position of the moving body 10 estimated by the self position estimation unit 132.

The cost map calculation unit 136 includes an image verification unit 201, a past path holding unit 202, a cost map generation unit 203, and a cost map holding unit 204.

The image verification unit 201 acquires image capturing information including a captured image captured by the security camera system 137 and executes verification. In the present embodiment, the image capturing information includes the captured image and an image capturing time at which the captured image is captured. Note that, in the present disclosure, an image includes both of a still image and a moving image (video).

The image capturing time is, for example, data representing a date and time, and is generated in association with the captured image. A method of generating data representing the image capturing time of the captured image, a format of the data, or the like, is not limited, and may be any method or format.

The present technology is not limited to a case where the data of the image capturing time is associated with the captured image. For example, it is assumed that a text image representing the image capturing time displayed in the captured image can be analyzed by image analysis by the image verification unit 201. In this case, the text image representing the image capturing time displayed in the captured image corresponds to the image capturing time in the present embodiment. Besides, any information capable of detecting the image capturing time can be included in the image capturing time in the present technology.

In addition, a time stamp may be associated with a traveling path of the moving body 10. The time stamp is data representing a date and time. In the present embodiment, a time at which the moving body 10 has passed through a predetermined point in the traveling path of the moving body 10 is recorded as the time stamp.

In the present embodiment, a second acquisition unit acquiring image capturing information including a captured image captured by an image capturing system capable of capturing an image of at least a part of a predetermined space is realized by the image verification unit 201.

The past path holding unit 202 acquires path information regarding a path of the moving body 10 that has moved (has been scanned) in a predetermined space such as an apartment or the like. In the present embodiment, the path information includes a position (passing position) through which the moving body 10 has passed and a passing time when the moving body 10 passes through the position. For example, the passing position and the passing time are generated on the basis of map information of a predetermined space, or the like.

Of course, a coordinate system may be set for the predetermined space and the passing position and the passing time may be generated, but are not limited thereto. A specific method of generating data representing the passing position and the passing time, a format of the data, or the like, is not limited, and may be any method or format.

In the present embodiment, a first acquisition unit that acquires the path information regarding the path of the moving body that has moved in the predetermined space is realized by the past path holding unit 202.

The cost map generation unit 203 generates a cost map for calculating a movement plan of the moving body 10 on the basis of a verification result (verification data) supplied by the image verification unit 201 and the path information supplied from the past path holding unit 202.

In the present embodiment, an image capturing range in which the image is captured by the security camera system 137 is detected on the basis of the verification data and the path information. Then, the cost map is generated on the basis of the detected image capturing range of the security camera system 137.

In the present embodiment, a calculation unit calculating plan information regarding the movement plan of the moving body on the basis of the acquired path information and image capturing information is realized by the image verification unit 201 and the cost map generation unit 203. Therefore, in the present embodiment, the image verification unit 201 also functions as the second acquisition unit and also functions as the calculation unit.

The cost map holding unit 204 holds the cost map generated by the cost map generation unit 203. Note that the number and types of cost maps to be held are not limited. For example, a plurality of cost maps in the same building may be held, or a cost map in a site such as a garden or the like of an apartment may be held for each condition such as weather or the like. Furthermore, the cost map holding unit 204 supplies the held cost map to the planning unit 134.

The storage unit 109 stores map information of a space in which the moving body 10 moves. Note that the map information may be separately created in advance and stored in the storage unit 109. Alternatively, the moving body 10 may create the map information by scanning the space. Furthermore, the map information may be learned by machine learning or the like each time the moving body 10 executes an action of moving to a destination in the space.

The planning unit 134 calculates the movement plan of the moving body on the basis of the cost map calculated by the cost map calculation unit 136. In the present embodiment, an optimal movement plan is calculated on the basis of the situation of the moving body 10, the destination, the cost map, and the map information. Note that the movement plan includes a path to the destination or a reference speed of the moving body 10. Of course, other parameters may be included in the movement plan.

The reference speed of the moving body 10 is a parameter which is a reference in determining a moving speed of the moving body 10. Typically, a maximum speed of the moving body 10 is used as the reference speed. For example, a high speed mode, a medium speed mode, a low speed mode, and the like are determined with respect to the moving speed of the moving body 10. In each mode, a speed is determined by multiplying the maximum speed by a coefficient. Therefore, the higher the maximum speed, the higher the speed of each mode. Of course, a method of determining the speed is not limited.

In the present embodiment, a movement planning unit calculating the movement plan of the moving body on the basis of calculated cost information is realized by the planning unit 134.

The action control processing unit 123 controls an operation of the moving body 10 on the basis of the movement plan supplied from the planning unit 134. Specifically, a control signal from the action control processing unit 123 is supplied to the drive system 108 (drive system control unit 107). The drive system 108 (drive system control unit 107) operates on the basis of the control signal, such that the moving body 10 moves. In the present embodiment, a movement mechanism that is movable in a predetermined space is realized by the drive system 108 (drive system control unit 107).

FIG. 3 is a view illustrating an outline of movement control of the moving body 10 according to the present embodiment. FIG. 4 is a flowchart illustrating an example of movement control of the moving body 10. In FIG. 3, the moving body 10 moving in a space (not illustrated) and the security camera system 137 capable of capturing an image of the space are schematically illustrated.

In the present embodiment, a case where the moving body 10 moves in the interior of an apartment or the like will be described by way of example. Then, a case where the moving body 10 is used as one function of a physical distribution system will be described by way of example. In other words, it is assumed that the moving body 10 is a robot capable of carrying a load such as a delivery article and delivering the load. In the present embodiment, map information of a space (hereinafter, may be referred to as a moving space) in which the moving body 10 moves is stored in advance in the moving body 10.

First, the moving space is scanned by the moving body 10 on the basis of the map information stored in advance (step 101). Then, path information in which a traveling path and a time stamp are linked to each other is generated. Note that the traveling path corresponds to information of a passing position, and the time stamp corresponds to information of a passing time. This processing corresponds to "SCAN INNER PORTION OF MOVING SPACE IN ADVANCE" illustrated in FIG. 3.

For example, a scanning mode for generating the path information is selected for the moving body 10. Then, the path information of the moving body 10 that has moved in the moving space in a state where the scanning mode is selected is acquired. Of course, the present technology is not limited to a case where a special scan mode such as a mode for generating the path information is prepared.

As illustrated in FIG. 3, an image of at least a part of the moving space is captured by the security camera system 137 during a period in which the moving body 10 scans the moving space. Typically, an image capturing range is often set around a common space such as a corridor portion or the like in front of an elevator. Of course, the image capturing range is not necessarily limited thereto.

The security camera system 137 generates and outputs image capturing information including a captured moving image in which a time stamp indicating an image capturing time is linked as metadata to each frame. The captured moving image corresponds to the captured image, and the time stamp corresponds to the image capturing time.

Image capturing information (captured moving image) of a time zone in which the moving space has been scanned in advance by the moving body 10 is loaded (step 102). The loaded image capturing information is output to the image verification unit 201, and verification of the captured image is performed.

In the present embodiment, the captured image in which an image of the moving body 10 is captured and the image capturing time of the captured image are detected from the image capturing information. In other words, a frame in which the image of the moving body 10 is captured and a time stamp of the frame are detected. This processing corresponds to "RECOGNIZE ROBOT ITSELF IN MOVING IMAGE" illustrated in FIG. 3.

A method of detecting the moving body 10 from the frame is not limited, and may be any technology. For example, any image recognition technology such as matching processing, edge detection, projection conversion, or the like, using a model image of the moving body 10 may be used. In order to detect the moving body 10, any machine learning algorithm using, for example, a deep neural network (DNN) or the like may be used. For example, by using artificial intelligence (AI) or the like that performs deep learning, it is possible to improve detection accuracy of the moving body 10.

Note that a predetermined quick response (QR) code (trademark registration) or the like, a predetermined controller, or the like may be provided on the exterior of the moving body 10 in order to detect the moving body 10. Of course, the moving body 10 is not limited thereto, and may be recognized from a self-luminous marker, a bar code, a color distribution of an image, an outline of the moving body, and the like. Note that, in the present embodiment, the QR code corresponds to a predetermined mark image, and the controller corresponds to a predetermined mark member. In other words, the moving body 10 includes an exterior portion provided with the predetermined QR code or the predetermined controller.

The cost map generation unit 203 calculates an image capturing range of the security camera system 137 while comparing a time stamp of a frame in which the moving body 10 appears with a time stamp of a traveling path (step 103). For example, it is assumed that the time stamp of the frame in which the moving body 10 appears has indicated a time a. A position of the moving body 10 on the path at the time a is calculated on the basis of a time stamp indicating the time a of the traveling path. The calculated position of the moving body 10 on the path is calculated as a position included in the image capturing range.

As described above, in the present embodiment, the path information created by the moving body 10 itself and the image capturing information generated by the security camera system 137 are collated with each other, such that the image capturing range of the security camera system 137 is detected. In other words, the image capturing range is detected by associating the passing time included in the path information and the image capturing time included in the image capturing information with each other.

The position, on the path, of the moving body 10 of which an image is captured in the frame is calculated on the basis of the time stamp of the frame in which the image of the moving body 10 is captured. The image capturing range of the security camera system 137 can be detected on the basis of the calculated position of the moving body 10 on the path.

The cost map is generated on the basis of the image capturing range of the security camera system 137 by the cost map generation unit 203. The generated cost map is held in the cost map holding unit 204 (step 104). In the present embodiment, the image capturing range is mapped to the map information of the moving space, and the cost map is generated on the basis of the mapping.

The planning unit 134 calculates a path for the moving body 10 to move to a destination of the moving body 10 on the basis of the generated cost map and the destination. The moving body 10 is controlled and moves along the calculated path by the action control processing unit 123 (step 105).

FIG. 5 is a flowchart illustrating an example of processing for generating a cost map. FIGS. 6A and 6B are schematic views for describing processing until the movement plan is calculated. FIG. 6A is a schematic view illustrating an example until the cost map is generated from the path information based on pre-scanning of the moving body 10. FIG. 6B is a schematic view illustrating an example until a movement plan of the moving body 10 is calculated from the generated cost map.

The pre-scanning is pre-scanning of the moving space based on the map information by the moving body 10 before the cost map is generated (see step 101 in FIG. 4). The pre-scanning can also be said to be a preparatory step of acquiring the path information and the image capturing information for generating the cost map.

As illustrated in FIG. 6A, the moving body 10 performs pre-scanning on a moving space 20. Then, the past path holding unit 202 holds past path information 11. Note that a traveling path is illustrated as the path information 11 in FIGS. 6A and 6B, but the traveling path and the passing time are linked to each other and held as the path information 11.

A traveling path of the path information 11 passes through an image capturing range 12 of the security camera system 137 captures an image of a part of the moving space 20. Therefore, the moving body 10 enters the image capturing range 12 of the security camera system 137, and the moving body 10 appears in a captured image at that time.

The image capturing range 12 is a range in which an image can be captured by the security camera system 137, and is determined by performance or the like of the security camera system 137. For example, a monitoring camera having a conical field of view in one direction or a monitoring camera capable of capturing an image at 360° is used as the security camera system 137. The image capturing range of the security camera system 137 is determined by an installation position, an installation direction, an angle of view (field of view), and the like, of each security camera.

Of course, a security camera system 137 in which a direction of the monitoring camera is movable may be constructed. In this case, the image capturing range 12 may be the entire image capturing range 12 of the monitoring camera or may be changed depending on a time cycle in which the direction of the monitoring camera is changed. In any case, it is possible to apply the present technology.

In the present embodiment, the security camera system 137 corresponds to an image capturing system capable of capturing an image of at least a part of a predetermined space.

As illustrated in FIG. 5, the image verification unit 201 performs a check for every frame from the image capturing information of the security camera system 137 projecting the moving body 10 that has moved within the moving space 20 at the time of pre-scanning, and verifies an image and a time in which the moving body (hereinafter, may be referred to a host device) 10 is projected (step 201).

The past path information 11 held by the past path holding unit 202 and the time in which the host device is projected in the image capturing range 12, which is verified in step 201, are collated with each other (step 202). The cost map generation unit 203 detects the image capturing range 12 of the security camera system 137 on the basis of the time in which the host device is projected and the corresponding path information 11.

In step 203, as illustrated in FIG. 6A, the detected image capturing range 12 is mapped onto a map by the cost map generation unit 203, such that a cost map 30 in which a cost of the surrounding of a path through which the host device has passed is set to be low is generated. The cost map holding unit 204 holds the generated cost map 30. In other words, in the present embodiment, the cost map 30 is calculated so that a cost regarding movement is lower inside the image capturing range 12 than outside the image capturing range 12.

In the present embodiment, the cost map 30 is generated on the basis of a plurality of grids having a square grid shape. Then, five stages of costs are set for the respective grids. Of course, the cost map 30 is not limited to having such a configuration, and a cost map 30 having any configuration may be generated.

A grid 31 illustrated in FIGS. 6A and 6B is a grid corresponding to a region in the image capturing range 12 of the security camera system 137. Furthermore, the grid 31 is a grid in which the entire moving body 10 positioned in the grid 31 is projected at the center of the captured image. The cost map generation unit 203 sets the minimum cost for the grid 31 inside such an image capturing range 12.

Note that whether or not the entire moving body 10 is projected for the captured image, a position where the entire moving body 10 is projected, and the like, can be determined using an image recognition technology or the like.

A grid 32 is a grid in which the entire moving body 10 positioned in the grid 32 is projected at an end portion of the captured image. The grid 32 is, for example, a grid that is included in the image capturing range 12 of the security camera system 137 but is positioned at the end portion of the image capturing range 12. Alternatively, the grid 32 can also be a grid of which a part is included in the image capturing range 12. Note that, in the present disclosure, a phrase "grid is included in the image capturing range 12" means that at least a part of the grid is included in the image capturing range 12.

The cost map generation unit 203 sets a cost higher than the minimum cost set for the grid 31 for the grid 32.

A grid 33 is a grid in which only a part of the moving body 10 positioned in the grid 32 is projected in the captured image. Note that a grid in a case where the entire moving body 10 is projected, but a size of the moving body 10 becomes smaller than a predetermined threshold value may also be set as the grid 33.

In a case where only a part of the moving body 10 is projected or in a case where the moving body 10 having a small size is projected, reliability of the detection of the moving body 10 becomes low. The grid 33 can also be said to be a grid in which reliability for the detection of the moving body 10 is low. The cost map generation unit 203 sets a cost higher than the cost set for the grid 32 for the grid 33.

A grid 34 is a grid corresponding to a region outside the image capturing range 12 of the security camera system 137. In other words, the grid 34 is a grid in which an image of the moving body 10 positioned in the grid 34 cannot be captured. The cost map generation unit 203 sets a cost higher than the cost set for the grid 33 for the grid 34.

Note that, for example, a grid that is included in an angle of view of the security camera, but is a blind spot due to an obstacle or the like, such that image capturing cannot be performed is also set as the grid 34. In other words, a grid deviated from the angle of view of the security camera, such that an image of the moving body 10 cannot be captured and a grid in which an image of the moving body 10 cannot be captured due to an obstacle or the like are set as the grid 34.

The obstacle includes both of an object of which a position is fixed, such as a bronze statue or the like, and a movable object such as a person or the like. In a case where the obstacle is movable, it may be possible to determine whether or not to set the corresponding grid as the grid 34 according to a time or the like when movement of the obstacle is expected. For example, in a case where the obstacle is detected, it is determined whether or not the obstacle has moved, on the basis of image capturing information after a predetermined time has elapsed. In a case where the obstacle has moved, the grid that has been the blind spot is set as one of the grids 31 to 33. In a case where the obstacle has not moved, the grid that has been the blind spot is set as the grid 34. Such processing may be performed.

A grid 35 is a place through which the moving body 10 cannot pass due to an obstacle or the like such as a wall or the like surrounding the moving space. The cost map generation unit 203 sets a cost of the place such as the grid 35 through which the moving body 10 cannot pass to be largest. Note that whether or not to set the place as the grid 35 may be determined on the basis of whether or not the obstacle is movable or whether or not the obstacle has moved.

As such, the cost map generation unit 203 sets the cost of the place at which the host device is projected in the captured image to be low, and sets the cost of the place at which the host device is not projected in the captured image to be high. As a result, the cost map in which the image capturing range 12 of the security camera system 137 is considered is generated.

Note that a method of generating the cost map is not limited. For example, the cost map may be generated by a path search algorithm such as an A star search algorithm, a Dijkstra method or the like. The cost map may be generated by calculating a cost function on the basis of the image capturing range 12 of the security camera system 137 and inputting a destination, situation information or the like to the cost function. Furthermore, any machine learning algorithm may be used.

Note that, in the present embodiment, the grids 31, 32 and 33 correspond to a first region included in the image capturing range. Furthermore, in the present embodiment, the grid 34 corresponds to a second region that is not included in the image capturing range.

As illustrated in FIG. 6B, the planning unit 134 calculates a movement plan of the moving body 10 on the basis of the cost map 30 generated by the cost map generation unit 203 (step 204). In the present embodiment, the planning unit 134 calculates the movement plan of the moving body so that a total cost from a start point of the movement to the destination is smallest. In other words, a path in which a cost regarding the movement is lowest is calculated.

Note that, in FIG. 6B, the cost of the grid 31 is set to "1", the cost of the grid 32 is set to "3", the cost of the grid 33 is set to "5", the cost of the grid 34 is set to "8", and the cost of the grid 35 is set to "10".

For example, in a movement plan of the moving body passing through path A, a total cost is "74". In a movement plan of the moving body passing through path B, a total cost is "167". The planning unit 134 calculates path A in which the total cost is low by comparing these calculated movement plans with each other, and supplies path A to the action control processing unit 123. As a result, the moving body 10 passes through a path in which the total cost is low, such that the moving body 10 easily passes through the image capturing range 12 of the monitoring camera.

Note that the generation of the cost map and the calculation of the movement plan described with reference to steps 103 to 105 illustrated in FIG. 4 and FIGS. 5 to 6B correspond to "IN CASE WHERE ROBOT IS PROJECTED", "COLLATE TRAVELING TRACK WITH TIME AND RECORD CORRESPONDING PLACE ON MAP (AND LOWER COST)", and "IT BECOMES EASY FOR MOVING BODY TO PASS THROUGH MONITORING RANGE FROM NEXT TIME" illustrated in FIG. 3.

FIG. 7 is a flowchart illustrating an example of movement to a destination based on the movement plan.

The planning unit 134 calculates a movement plan for the moving body 10 to move to the destination on the basis of the cost map generated by the cost map generation unit 203 and the destination (step 301). Note that in a case where a relay point or the like is set, the relay point is also included in the destination. For example, a movement plan from a start point to the relay point set as a destination and a movement plan from the relay point to a final destination may be calculated. Of course, a movement plan from the start point to the final destination may be calculated at one time so as for the moving body to pass through the relay point.

Furthermore, after the moving body 10 arrives at destination A, a movement plan for the moving body 10 to move to destination B can also be newly calculated using destination A as a start point.

The action control processing unit 123 controls the movement of the moving body 10 on the basis of the movement plan calculated by the planning unit 134 (step 302). When the moving body 10 is moving, the sensor group 112 detects an obstacle or the like on a path of the movement plan, and in a case where obstacle information regarding the obstacle is acquired, it is determined whether or not the moving body 10 can pass through a place at which the obstacle exists while avoiding the obstacle (step 303). Note that, in the present embodiment, a third acquisition unit acquiring the obstacle information regarding the obstacle detected by the moving body 10 is realized by the sensor group 112.

The obstacle information includes information of an object such as a person, furniture, or the like temporarily arranged at the position. Examples of the obstacle information include time information indicating whether a person moves immediately from the place if the obstacle is the person or passable information indicating whether the moving body can avoid a large object such as furniture or the like if the obstacle is the large object such as the furniture or the like. Of course, the obstacle information is not limited thereto, and various types of information may be linked to various objects and may be generated as the obstacle information.

When the moving body cannot move according to the movement plan due to the obstacle or the like (YES in step 303), the cost map generation unit 203 raises a cost of a place at which the obstacle or the like exists, on the cost map (step 304).

For example, in a case where the moving body 10 cannot pass through the place by construction, the cost map generation unit 203 sets (updates) a cost to the maximum. The planning unit 134 calculates the movement plan so that a construction place is not included on the path of the movement plan on the basis of the newly set cost map (step 301).

Furthermore, in a case where there has been a change in the destination while the moving body 10 goes to the destination (YES in step 305), processing returns to step 301, and the planning unit 134 calculates a movement plan to the newly changed destination on the basis of the cost map.

Note that processing for moving the moving body 10 to the destination, an order in which the processing is performed, or the like, is not limited. For example, in a case where the moving body 10 has broken down, processing such as communication or the like may be performed.

FIGS. 8A and 8B are schematic views illustrating an example of movement according to the movement plan of the moving body 10. FIG. 8A is a schematic view illustrating an example of an aspect of the movement plan of the moving body passing through an image capturing range 12 of a monitoring camera.

In the example illustrated in FIG. 8A, an elevator 41 is arranged in a moving space 40. A broken line portion is an entrance of the elevator 41, and many persons go in and out of the entrance of the elevator 41. Note that examples of places in and out of which many persons go include a stairway, an entrance to a room, and the like, in addition to the entrance of the elevator 41.

The security camera system 137 is configured to be able to capture an image of the entrance of the elevator 41 and a corridor in contact with the entrance of the elevator 41. As illustrated in FIG. 8A, a path from a movement start point to a destination, passing through the corridor in front of the entrance of the elevator 41 is a path of which an image of substantially the entirety is captured by the security camera system 137.

On the other hand, a path (not illustrated) passing through a corridor behind the elevator 41 is a path of which an image of substantially the entirety is not captured by the security camera system 137. Specifically, while the moving body moves from the movement start point along the corridor behind the elevator 41, an image is not captured by the security camera system 137. Only from the vicinity at which the moving body 10 comes out of the corridor behind the elevator 41, it is possible to capture an image of the moving body 10.

As described above, a low cost is set in a region that is within the image capturing range 12 of the security camera system 137. A high cost is set in a region that is out of the image capturing range 12 of the security camera system 137. Hereinafter, the region that is within the image capturing range 12 will be referred to as a low cost region 42, and the region that is out of the image capturing range 12 will be referred to as a high cost region 43.

The planning unit 134 calculates the movement plan so that the moving body passes through the low cost region 42 in which a total cost is low. It is assumed that the moving body 10 cannot move because many persons are gathered or a large load or the like is left in front (broken line portion) of the elevator 41. In this case, the cost map generation unit 203 sets (updates) a cost of the low cost region 42 to the maximum (from YES in step 303 to step 304). The planning unit 134 updates the movement plan on the basis of the updated cost map. As a result, for example, a movement plan of the moving body passing through the high cost region 43 is calculated. The moving body 10 arrives at the destination by passing through the high cost region 43.

As such, the cost map generation unit 203 can update the cost map according to a movement situation of the moving body 10. Note that a determination time for determining whether or not to update the cost map may be appropriately set by the cost map generation unit 203.

For example, in a case where an obstacle in front of the elevator 41 moves, it is possible to move the moving body 10 according to the movement plan. Therefore, a determination time is appropriately set, and the moving body 10 is made to be stopped and to stand by until the determination time elapses. In a case where the obstacle does not move even though the determination time elapses, such that the moving body cannot move, the cost map is updated. In a case where the obstacle has moved before the determination time elapses, such that the moving body has become movable, the cost map is not updated. As a result, it is possible to appropriately cope with a movable obstacle such as a person.

Note that the determination time may be set to be different between a case where the moving body 10 is positioned in the low cost region 42 and a case where the moving body 10 is positioned in the high cost region 43. Specifically, the determination time in the case where the moving body 10 is positioned in the high cost region 43 is set to be shorter than that in the case where the moving body 10 is positioned in the low cost region 42.

For example, in a case where the obstacle is detected in the low cost region 42, it is possible for the moving body to stand by for a sufficient time and determine whether or not to update the cost map. On the other hand, in a case where the obstacle is detected in the high cost region 43, it is determined in a short time whether or not to update the cost map. As a result, it is possible to move the moving body 10 so as to pass through the low cost region 42 as much as possible without causing the moving body 10 to stand by for a long time in the high cost region 43, which is a region outside the image capturing range 12.

The determination time of whether or not the moving body 10 updates the cost map due to the obstacle or the like can be said to be a reroute decision time. Furthermore, in a case where the determination time is short, an update speed of the cost map is fast, and in a case where the determination time is long, an update speed of the cost map is slow. Therefore, these update speeds of the cost map can be said to be reroute decision speeds. In other words, the short reroute decision time and the fast reroute decision speed are the same as each other. A specific example of the reroute decision time and the reroute decision speed will be described with reference to FIG. 10B.

Note that a method of setting the cost is not limited. For example, in a case where the moving body 10 is projected at a predetermined position of a captured image, the cost may be set to be low or to be high. Furthermore, for example, a cost of a crowded place such as a front of the elevator, or the like, may be set to be high to allow the moving body to not move in the crowded place. Of course, contrary to the present embodiment, the cost within the image capturing range 12 may be raised, and the movement plan of the moving body may be calculated so that a total cost becomes the maximum.

Note that the movement plan including a delivery position of a load by the moving body 10 may be calculated. For example, in the high cost region 43 that is out of the image capturing range 12, the movement plan is calculated so that delivery of the load is restricted. As a result, the delivery of the load is performed within the image capturing range 12, such that the load or the like carried by the moving body 10 can be prevented from being stolen and security can be improved.

FIG. 8B is a schematic view illustrating an example of an aspect in which an obstacle exists in the image capturing range 12.

A moving space 50 illustrated in FIG. 8B is, for example, an interior such as a room or the like. In the moving space 50, an obstacle 51 such as a shelf, a locker or the like is arranged. A blind spot region 54 in which an image cannot be captured by the security camera system 137 is formed by the obstacle 51. The blind spot region 54 is a region outside the image capturing range 12. Of course, a type of the obstacle 51 is not limited, and may be a protruding wall of a part of the moving space 50 or furniture or a person temporarily existing at the place.

As illustrated in FIG. 8B, a region inside the image capturing range 12 between the obstacle 51 and the security camera system 137 is set as a low cost region 52. The blind spot region 54 formed by the obstacle 51 is a region outside the image capturing range 12 and is set as a high cost region 53.

With respect to a region behind the obstacle 51 and behind the blind spot region 54 when viewed from the security camera system 137, a cost higher than that of the low cost region 52 between the obstacle 51 and the security camera system 137 is set. As a result, it is possible to move the moving body 10 so as to pass in front of the security camera.

For example, the low cost region 52 is within the image capturing range 12 of the security camera system 137 as in the grid 31 of FIGS. 6A and 6B, and a cost map is thus calculated so that a cost of the low cost region 52 is lower than those of the high cost region 53 and the blind spot region 54.

The high cost region 53 is a region in which only a part of the moving body 10 is projected in a captured image as in the grid 33 of FIGS. 6A and 6B. In other words, the entire moving body 10 is not projected due to the obstacle 51, and a cost of the high cost region 53 is thus set to be higher than that of the low cost region 52 and be lower than that of the blind spot region 54.

The blind spot region 54 is a region corresponding to the grid 34 of FIGS. 6A and 6B. In other words, the blind spot region 54 is a region which is included in the image capturing range 12 of the security camera system 137 but in which an image cannot be captured due to a height of the obstacle 51 or a position relationship between the obstacle 51 and the moving body 10.

Note that settings and conditions of the low cost region 52, the high cost region 53, and the blind spot region 54 are not limited. For example, the blind spot region 54 may be included in the high cost region 53. Furthermore, the low cost region 52 and the high cost region 53 may be divided according to a degree of reliability of detection of the moving body 10.

The planning unit 134 calculates a movement plan from the generated cost map on the basis of the low cost region 52, the high cost region 53, and the blind spot region 54. The moving body 10 passes through the low cost region 52 while avoiding the high cost region 53 and the blind spot region 54 and arrives at a destination, according to the calculated movement plan.

FIG. 9 is a schematic view illustrating an example of calculation of a blind spot in a case where there is an obstacle in a field of view 61.

Similar to steps 301 and 302 in FIG. 4, the moving body 10 compares path information 11 obtained by pre-scanning an inner portion of a space 60 and image capturing information captured by the security camera system 137 with each other.

At this time, the image verification unit 201 geometrically estimates a position of the security camera system 137 from a relationship of a direction or a position in which the moving body 10 is projected in a captured image. For example, a distance to the security camera system 137 is estimated from a size of the moving body 10 that is projected. The cost map generation unit 203 holds the estimated position of the security camera system 137 as map information.

Furthermore, the image verification unit 201 estimates the field of view 61 of the security camera system 137 from image capturing information obtained from prescanning. For example, the field of view 61 is estimated from the size of the moving body 10 that is projected, a place where the moving body 10 is partially projected, or the like. As illustrated in FIG. 9, the field of view 61 corresponds to the image capturing range 12, and is schematically held in a rectangular shape in the map information. It is assumed that the sensor group 112 of the moving body 10 has detected an obstacle 62 existing in the field of view 61 when the moving body 10 is moving according to a movement plan in the field of view 61.

In this case, since the position of the security camera system 137 is held in the map information by the cost map generation unit 203, the cost map generation unit 203 geometrically calculates a position of a blind spot region 63 caused by the obstacle 62 from a position relationship between the obstacle 62 and the security camera system 137.

The blind spot region 63 is a region in which an image of the moving body 10 cannot be captured from the security camera system 137 due to the obstacle 62, similar to the blind spot region 54. Shapes or the like of the blind spot region 54 and the blind spot region 63 are not limited. For example, a case where reliability of detection of the moving body by the image verification unit 201 does not exceed a predetermined threshold value may be set as the blind spot region.

The cost map generation unit 203 dynamically raises a cost of the calculated blind spot region 63 to update a cost map. The planning unit 134 calculates a movement plan so that the moving body does not pass through the blind spot region 63 on the basis of the updated cost map.

FIGS. 10A and 10B are schematic views illustrating an example of a speed of the moving body 10 and a processing time of update of a movement plan.

A speed of the moving body, which is included in the movement plan calculated by the planning unit 134, will be described with reference to FIG. 10A.

As illustrated in FIG. 10A, a space 71 and a space 72 are set in a space 70. The space 71 is a region including the image capturing range 12 of the security camera system 137. The space 72 is a region outside the image capturing range 12 of the security camera system 137. In other words, the space 71 corresponds to the grid 31 of FIGS. 6A and 6B, and the space 72 corresponds to the grid 34 of FIGS. 6A and 6B. Note that, in the present embodiment, the space 20, the space 40, the space 50, the space 60, and the space 70 correspond to predetermined spaces. Furthermore, each of these spaces may be used as map information.

The moving body 10 is controlled to move at a predetermined reference speed. The reference speed is a speed at which the moving body 10 moves at the normal time. The normal time is a state where there are no persons or obstacles around the moving body 10. In other words, the normal time indicates a state where the sensor group 112 does not detect a factor that hinders autonomous movement of the moving body 10.

For example, at a place (inside the image capturing range 12) of which a cost is low, such as the space 71 or the grid 31 of FIGS. 6A and 6B, the moving body 10 moves in a medium speed mode. Note that a speed and a setting of the reference speed are not limited. For example, even in the image capturing range 12, in a case where the moving body 10 detects a large number of persons or obstacles, the moving body 10 may move in a low speed mode where a speed is lower than the reference speed. Of course, a condition in which the moving body 10 moves in the image capturing range 12 at a speed faster than the reference speed may be set. For example, the speed may be changed in consideration of the residual quantity of a battery embedded in the moving body 10 or safety of the surrounding of the moving body.

In a case where the self position estimation unit 132 detects that the moving body 10 has invaded the space 72, the moving body 10 moves in a high speed mode where a speed is faster than the reference speed when it has moved in the space 71. For example, the moving body 10 moves at a high speed in the space 72, and invades an image capturing range different from that of the space 71 (not illustrated). In other words, the moving body 10 can reduce a staying time in which it is out of the image capturing range 12 as much as possible.

A processing time of update of the movement plan, which is included in the movement plan calculated by the planning unit 134, will be described with reference to FIG. 10B.

As illustrated in FIG. 10B, the moving body 10 is moving according to a movement plan 74. A place at which the moving body 10 is moving is out of the image capturing range 12 of the security camera system 137, similar to the grid 34 of FIGS. 6A and 6B.

Furthermore, an obstacle 73 that does not exist at a timing when the moving body 10 performs pre-scanning to calculate the movement plan 74 is arranged on the movement plan 74 in front of a destination. In other words, the moving body 10 needs to update the movement plan 74 and detour, in order to arrive at the destination.

In this case, similar to YES in step 303 of FIG. 7 and step 304 of FIG. 7, the obstacle 73 is detected and a cost of a corresponding place of a cost map is set to infinity. The movement plan 74 is updated to a new movement plan 75 on the basis of this cost map.

A determination time until the movement plan 74 is updated to the movement plan 75 corresponds to a reroute decision time. Furthermore, since the moving body 10 cannot move according to the movement plan 74 due to the obstacle 73, a determination speed until it is determined that the cost map needs to be updated corresponds to a reroute decision speed.

Since the moving body 10 detects the obstacle 73 when it moves outside the image capturing range 12 according to the movement plan 74, the moving body 10 updates the movement plan 74 in a time shorter than a reroute decision time in a case where the moving body is positioned in a region included in the image capturing range 12.

In other words, the cost map generation unit 203 determines whether or not to update the movement plan 74 according to a movement situation of the obstacle 73 or the like of the moving body 10, and a determination time for determining whether or not to update the movement plan 74 in a case where the moving body 10 is positioned in a second region that is not included in the image capturing range 12 is set to be shorter than a determination time in a case where the moving body 10 is positioned in a first region that is included in the image capturing range 12.

Furthermore, as illustrated in FIG. 10A, the moving body 10 is out of the image capturing range 12, and thus moves in a high speed mode. As a result, the moving body 10 can reduce a staying time in which it is out of the image capturing range as much as possible, and can reduce a security risk that it passes through the outside of the image capturing range of the security camera system.

As described above, in the movement planning system 200 according to the present embodiment, the path information 11 of the moving body 10 that has moved in the predetermined space and the image capturing information of the security camera system 137 capturing an image of the predetermined space are acquired. The image capturing range 12 in which the image is captured by the security camera system 137 is detected on the basis of the acquired path information 11 and image capturing information, and the cost map 30 regarding the movement of the moving body 10 is calculated so that the cost regarding the movement is lower in the grid 31, the grid 32, and the grid 33 that are included in the image capturing range within the predetermined space than in the grid 34 that is not included in the image capturing range 12. As a result, it is possible to easily create a movement plan based on an image capturing range of another image capturing system.

The generated cost map lowers the cost within the image capturing range 12 of the security camera system 137 such as the monitoring camera or the like to calculate the path, and it thus becomes easy for the moving body 10 to pass through the image capturing range 12. As a result, it becomes possible to confirm the moving body 10 carrying the load with the monitoring camera, and a risk that the moving body 10 is broken, the load is taken away, and the moving body 10 itself is stolen is thus suppressed, such that it is possible to increase safety.

Furthermore, since the movement plan is calculated so that the delivery of the load is performed within the image capturing range 12 of the security camera system 137, it is possible to prevent impersonation of a person who receives the load.

Furthermore, by receiving the image capturing information from the security camera system 137 such as the monitoring camera or the like already arranged in the apartment or the like, it is possible to reduce a cost required for newly developing and introducing a monitoring camera and system capable of communicating and cooperating with the moving body 10.

By generating the cost map and calculating the movement plan by the scanning of the predetermined space by the moving body 10, there is no need to perform special communication or pre-input by a person at the time of calculating the movement plan. As a result, it is possible to reduce a cost.

When the moving body 10 is out of the image capturing range of the security camera system 137, the reroute decision speed and the moving speed of the moving body 10 can be increased. As a result, it is possible to decrease a time in which the moving body 10 is out of the image capturing range, and it is thus possible to increase the safety of the moving body 10 and the load carried by the moving body 10.

Other Embodiments

The present technology is not limited to the embodiment described above, and various other embodiments can be realized.

In the above embodiment, the path information 11 in the space has been acquired by one moving body 10. The present technology is not limited thereto, and the cost map may be generated using path information acquired from similar spaces of different floors of the apartment, or the like, or the route information may be acquired by scanning a plurality of moving bodies in the space. Furthermore, in a case where information such as a field of view, a position or the like of the monitoring camera is known, the cost map may be generated by inputting the information without performing pre-scanning.

In the above embodiment, the cost of the cost map has been dynamically changed by the detection of the obstacle 62 in the field of view 61. The present technology is not limited thereto, and in a case where the obstacle is detected, the moving body 10 may perform avoidance movement for avoiding the obstacle without changing the cost map. Furthermore, machine learning or the like that increases accuracy by adjusting plus or minus of the cost of the generated cost map on the basis of each type of information acquired by the moving body 10 on a daily basis may be performed.

Moreover, in the above embodiment, when the image verification unit 201 detects the moving body 10, authentication accuracy is increased using the predetermined mark image and the predetermined mark member. The present technology is not limited thereto, and the authentication accuracy may be increased by a specific motion of the moving body 10 or a specific light, a motion and the like of a motion controller or the like.

Furthermore, in the above embodiment, the delivery position of the load is included in the movement plan. The present technology is not limited thereto, and the delivery position of the load may deviate from the movement plan. In other words, a dedicated movement plan or action at the time of delivering the load may be controlled.

Furthermore, the path information acquired, the cost map generated, and the movement plan calculated by causing one moving body 10 to scan an inner portion of a predetermined space may be shared with a plurality of other moving bodies 10 by operating in conjunction with another computer (cloud system) that can perform communication through a network or the like.

The moving body 10 may include the movement planning system 200, such that the moving body 10 itself may calculate the movement plan and control the autonomous movement. In other words, an information processing apparatus is realized by the moving body 10, such that an information processing method is executed.

Furthermore, the moving body 10 may include the sensor group 112, the self position estimation unit 132, the drive system 108 and the like, and the movement of the moving body 10 may be controlled by transmitting required information to the cloud system or the like including the movement planning system 200 and receiving the movement plan calculated from the cloud system. For example, the communication unit 103 transmits information required for calculating the movement plan to the cloud system or the like, and receives the movement plan from the cloud system or the like. In other words, the communication unit 103 corresponds to a transmission unit transmitting the calculated plan information to the moving body.

In other words, an information processing apparatus is realized by the cloud system or the like, such that an information processing method is executed. For example, the cloud system may include the cost map calculation unit 136 to calculate the cost map on the basis of the information transmitted from the moving body 10 and the security camera system 137.

Furthermore, a computer mounted on the moving body 10 and another computer (cloud system) that can perform communication through a network or the like may operate in conjunction with each other, such that an information processing method and a program according to the present technology may be executed and an information processing apparatus according to the present technology may be constructed.

In other words, the information processing method and the program according to the present technology can be executed not only in a computer system including a single computer but also in a computer system in which a plurality of computers operates in conjunction with each other. Note that, in the present disclosure, the system means a set of a plurality of components (apparatuses, modules (parts), or the like), and it does not matter whether or not all the components are in the same housing. Therefore, both of a plurality of devices housed in separate housings and connected to each other through a network and one device in which a plurality of modules is housed in one housing are systems.

Execution of the information processing method and the program according to the present technology by a computer system includes, for example, both of a case where the acquisition of image capturing information, the generation of the cost map, the calculation of the movement plan, and the like, are executed by a single computer and a case where the respective pieces of processing are executed by different computers. Furthermore, execution of the respective pieces of processing by a predetermined computer includes causing another computer to execute some or all of the pieces of processing and acquiring a result of the execution.

Control flows or the like, of the information processing apparatus, the cost map generation unit, the planning unit, and the like described with reference to the drawings are only an embodiment, and can be arbitrarily modified without departing from the scope of the present technology. In other words, any other configuration, algorithm or the like for implementing the present technology may be adopted.

It is possible to combine at least two features of the features according to the present technology described above with each other. In other words, various features described in each embodiment may be arbitrarily combined with each other without distinction of each embodiment. Furthermore, the various effects described above are only examples and are not limited, and other effects may be exerted.

Note that the present technology can also have the following configuration.

(1) An information processing apparatus including:
a first acquisition unit that acquires path information regarding a path of a moving body that has moved in a predetermined space;
a second acquisition unit that acquires image capturing information including a captured image captured by an image capturing system capable of capturing an image of at least a part of the predetermined space; and
a calculation unit that detects an image capturing range in which an image is captured by the image capturing system on the basis of the acquired path information and image capturing information and calculates cost information regarding movement of the moving body so that a cost regarding the movement is lower in a first region that is included in the image capturing range within the predetermined space than in a second region that is not included in the image capturing range.

(2) The information processing apparatus according to (1), in which the path information includes a position through which the moving body has passed and a passing time at which the moving body has passed through the position,
the image capturing information includes an image capturing time at which the captured image has been captured, and
the calculation unit detects the image capturing range by associating the passing time included in the path information with the image capturing time included in the image capturing information.

(3) The information processing apparatus according to (2), in which the calculation unit detects the captured image in which an image of the moving body is captured from the acquired image capturing information, calculates a position, on a path, of the moving body of which the image is captured in the captured image on the basis of the image capturing time of the detected captured image in which the image of the moving body is captured, and detects the image capturing range on the basis of the calculated position of the moving body on the path.

(4) The information processing apparatus according to any one of (1) to (3), further including a movement planning unit that calculates a movement plan of the moving body on the basis of the calculated cost information.

(5) The information processing apparatus according to (4), in which the movement planning unit calculates a path in which a cost regarding the movement is lowest on the basis of the cost information.

(6) The information processing apparatus according to (4) or (5), in which the movement plan includes a reference speed of the moving body, and
the movement planning unit calculates the movement plan so that the reference speed when the moving body passes through the first region that is included in the image capturing range is smaller than the reference speed when the moving body passes through the second region that is not included in the image capturing range.

(7) The information processing apparatus according to any one of (1) to (6), further including a transmission unit that transmits the cost information calculated by the calculation unit to the moving body.

(8) The information processing apparatus according to (7), further including a movement planning unit that calculates a movement plan of the moving body on the basis of the calculated cost information,
in which the transmission unit transmits the movement plan calculated by the movement planning unit to the moving body.

(9) The information processing apparatus according to any one of (1) to (6), further including a movement mechanism that is movable in the predetermined space,
in which the movement mechanism is configured as a moving body.

(10) The information processing apparatus according to any one of (1) to (9), further including a third acquisition unit that acquires obstacle information regarding an obstacle detected by the moving body,
in which the calculation unit updates the cost information on the basis of the acquired obstacle information.

(11) The information processing apparatus according to any one of (4) to (6), in which the moving body is able to carry a load and deliver the load,
the movement plan includes a delivery position of the load by the moving body, and the movement planning unit calculates the movement plan so that the delivery of the load by the moving body is restricted in the second region.

(12) The information processing apparatus according to any one of (1) to (11), in which the calculation unit determines whether or not to update the cost information according to a movement situation of the moving body, and a determination time for determining whether or not to update the cost information in a case where the moving body is positioned in the second region that is not included in the image capturing range is set to be shorter than the determination time in a case where the moving body is positioned in the first region that is included in the image capturing range.

(13) The information processing apparatus according to (3), in which the moving body includes an exterior portion provided with a predetermined mark image or a predetermined mark member, and
the calculation unit detects the captured image in which the image of the moving body is captured by detecting the predetermined mark image or the predetermined mark member.

(14) The information processing apparatus according to any one of (1) to (13), in which the first acquisition unit acquires the path information of the moving body that has moved in the predetermined space in a state where a mode for generating the path information is selected.

(15) The information processing apparatus according to any one of (1) to (14), in which the moving body moves in the predetermined space on the basis of map information of the predetermined space.

(16) An information processing method executed by a computer system, including: acquiring path information regarding a path of a moving body that has moved in a predetermined space;
acquiring image capturing information including a captured image captured by an image capturing system capable of capturing an image of at least a part of the predetermined space; and
detecting an image capturing range in which an image is captured by the image capturing system on the basis of the acquired path information and image capturing information and calculating cost information regarding movement of the moving body so that a cost regarding the movement is lower in a first region that is included in the image capturing range within the predetermined space than in a second region that is not included in the image capturing range.

(17) A program causing a computer system to execute:
acquiring path information regarding a path of a moving body that has moved in a predetermined space;
acquiring image capturing information including a captured image captured by an image capturing system capable of capturing an image of at least a part of the predetermined space; and
detecting an image capturing range in which an image is captured by the image capturing system on the basis of the acquired path information and image capturing information and calculating cost information regarding movement of the moving body so that a cost regarding the movement is lower in a first region that is included in the image capturing range within the predetermined space than in a second region that is not included in the image capturing range.

Note that the present technology can also have the following configuration.

(1) An apparatus, comprising:
a body and a movement device attached thereto, wherein the body comprises a control unit in communication with the movement device, the control unit comprising at least one processor and a memory configured to store instructions that, when executed by the at least one processor, cause the at least one processor to:
receive image capture range information for one or more imaging devices located external to the apparatus;
calculate a movement path for the apparatus based, at least in part, on the received image capture range information; and
control the movement device to move the apparatus in accordance with the calculated movement path.

(2) The apparatus of (1), wherein the apparatus comprises a mobility device.

(3) The apparatus of (1), wherein
the image capture range information includes image capture information for each of a plurality of imaging devices, and
calculating a movement path comprises calculating the movement path to include an area within the image capture range of each of the plurality of imaging devices.

(4) The apparatus of (1), wherein calculating a movement path comprises:
generating a cost map for a space through which the apparatus is to move, wherein the cost map includes low cost areas and high cost areas of the space; and
calculating the movement path based, at least in part, on the cost map.

(5) The apparatus of (4), wherein calculating the movement path based, at least in part, on the cost map comprises determining a lowest cost movement path between two locations in the space based on the low cost areas and high costs areas defined in the cost map.

(6) The apparatus of (4), wherein calculating the movement path based, at least in part, on the received image capture range information comprises:
generating the cost map to define areas of the space within the image capture range of the one or more imaging devices to be low cost areas and to define areas of the space outside of the image capture range of the one or more imaging devices to be high cost areas.

(7) The apparatus of (4), wherein calculating a movement path is further based, at least in part, on at least one obstacle within the space through which apparatus is to move.

(8) The apparatus of (7), wherein the at least one obstacle is transient.

(9) The apparatus of (1), wherein
at least one of the one or more imaging devices has an image capture range that changes over time, and
calculating the movement path for the apparatus is based, at least in part, on a travel speed of the apparatus and the image capture range that changes over time.

(10) The apparatus of (1), wherein the instructions are further configured to cause the at least one processor to:
receive an image from the one or more imaging devices;
determine whether the apparatus is present in the image; and
recalculate the movement path based, at least in part, on whether the apparatus is determined to be present in the image.

(11) A method, comprising:
receiving image capture range information for one or more imaging devices located external to an apparatus;
calculating, by at least one computer processor, a movement path for the apparatus based, at least in part, on the received image capture range information; and
controlling a movement device of the apparatus to move the apparatus in accordance with the calculated movement path.

(12) The method of (11), wherein
the image capture range information includes image capture information for each of a plurality of imaging devices, and
calculating a movement path comprises calculating the movement path to include an area within the image capture range of each of the plurality of imaging devices.

(13) The method of (11), wherein calculating a movement path comprises:
generating a cost map for a space through which the apparatus is to move, wherein the cost map includes low cost areas and high cost areas of the space; and
calculating the movement path based, at least in part, on the cost map.

(14) The method of (13), wherein calculating the movement path based, at least in part, on the cost map comprises determining a lowest cost movement path between two locations in the space based on the low cost areas and high costs areas defined in the cost map.

(15) The method of (13), wherein calculating the movement path based, at least in part, on the received image capture range information comprises:
generating the cost map to define areas of the space within the image capture range of the one or more imaging devices to be low cost areas and to define areas of the space outside of the image capture range of the one or more imaging devices to be high cost areas.

(16) The method of (13), wherein calculating a movement path is further based, at least in part, on at least one obstacle within the space through which apparatus is to move.

(17) The method of (16), wherein the at least one obstacle is transient.

(18) The method of (11), wherein
at least one of the one or more imaging devices has an image capture range that changes over time, and
calculating the movement path for the apparatus is based, at least in part, on a travel speed of the apparatus and the image capture range that changes over time.

(19) The method of (11), further comprising:
receiving an image from the one or more imaging devices;
determining whether the apparatus is present in the image; and
recalculating the movement path based, at least in part, on whether the apparatus is determined to be present in the image.

(20) An apparatus path planning system, comprising:
one or more imaging devices configured to capture images within a space, wherein each of the one or more imaging devices has an image capture range; and
an apparatus comprising:
a body and a movement device attached thereto, wherein the body comprises a control unit in communication with the movement device, the control unit comprising at least one processor and a memory configured to store instructions that, when executed by the at least one processor, cause the at least one processor to:
receive, from the one or more imaging devices, image capture range information describing the image capture range of each of the one or more imaging devices;
calculate a movement path for the apparatus based, at least in part, on the received image capture range information; and
control the movement device to move the apparatus in accordance with the calculated movement path.

REFERENCE SIGNS LIST

10 Moving body
100 Moving body control system
103 Communication unit
112 Sensor group
134 Planning unit
136 Cost map calculation unit
200 Movement planning system
201 Image verification unit
202 Past path holding unit
203 Cost map generation unit
204 Cost map holding unit

The invention claimed is:

1. An apparatus, comprising:
a body and a movement device attached thereto, wherein the body comprises a control unit in communication with the movement device, the control unit comprising at least one processor and a memory configured to store instructions that, when executed by the at least one processor, cause the at least one processor to:
receive image capture range information for one or more imaging devices located external to the apparatus, wherein the image capture range information includes a range in which an image can be captured by the one or more imaging devices;
calculate a movement path for the apparatus based, at least in part, on the received image capture range information; and
control the movement device to move the apparatus in accordance with the calculated movement path.

2. The apparatus of claim 1, wherein the apparatus comprises a mobility device.

3. The apparatus of claim 1, wherein the image capture range information includes image capture range information for each of a plurality of imaging devices, and wherein calculating the movement path comprises calculating the movement path to include an area within the image capture range of each of the plurality of imaging devices.

4. The apparatus of claim 1, wherein calculating the movement path comprises:
generating a cost map for a space through which the apparatus is to move, wherein the cost map includes low cost areas and high cost areas of the space; and
calculating the movement path based, at least in part, on the cost map.

5. The apparatus of claim 4, wherein calculating the movement path based, at least in part, on the cost map comprises determining a lowest cost movement path between two locations in the space based on the low cost areas and high cost areas defined in the cost map.

6. The apparatus of claim 4, wherein calculating the movement path based, at least in part, on the received image capture range information comprises:
generating the cost map to define areas of the space within the image capture range of the one or more imaging devices to be low cost areas and to define areas of the space outside of the image capture range of the one or more imaging devices to be high cost areas.

7. The apparatus of claim 4, wherein calculating the movement path is further based, at least in part, on at least one obstacle within the space through which the apparatus is to move.

8. The apparatus of claim 7, wherein the at least one obstacle is transient.

9. The apparatus of claim 1, wherein the instructions are further configured to cause the at least one processor to:
receive an image from the one or more imaging devices;
determine whether the apparatus is present in the image; and
recalculate the movement path based, at least in part, on whether the apparatus is determined to be present in the image.

10. An apparatus, comprising:
a body and a movement device attached thereto, wherein the body comprises a control unit in communication with the movement device, the control unit comprising at least one processor and a memory configured to store instructions that, when executed by the at least one processor, cause the at least one processor to:

receive image capture range information for one or more imaging devices located external to the apparatus;

calculate a movement path for the apparatus based, at least in part, on the received image capture range information; and control the movement device to move the apparatus in accordance with the calculated movement path, wherein at least one of the one or more imaging devices has an image capture range that changes over time, and wherein calculating the movement path for the apparatus is based, at least in part, on a travel speed of the apparatus and the image capture range that changes over time.

11. A method, comprising:

receiving image capture range information for one or more imaging devices located external to an apparatus, wherein the image capture range information includes a range in which an image can be captured by the one or more imaging devices;

calculating, by at least one computer processor, a movement path for the apparatus based, at least in part, on the received image capture range information; and controlling a movement device of the apparatus to move the apparatus in accordance with the calculated movement path.

12. The method of claim 11, wherein the image capture range information includes image capture range information for each of a plurality of imaging devices, and wherein calculating the movement path comprises calculating the movement path to include an area within the image capture range of each of the plurality of imaging devices.

13. The method of claim 11, wherein calculating the movement path comprises:

generating a cost map for a space through which the apparatus is to move, wherein the cost map includes low cost areas and high cost areas of the space; and calculating the movement path based, at least in part, on the cost map.

14. The method of claim 13, wherein calculating the movement path based, at least in part, on the cost map comprises determining a lowest cost movement path between two locations in the space based on the low cost areas and high costs areas defined in the cost map.

15. The method of claim 13, wherein calculating the movement path based, at least in part, on the received image capture range information comprises:

generating the cost map to define areas of the space within the image capture range of the one or more imaging devices to be low cost areas and to define areas of the space outside of the image capture range of the one or more imaging devices to be high cost areas.

16. The method of claim 13, wherein calculating the movement path is further based, at least in part, on at least one obstacle within the space through which the apparatus is to move.

17. The method of claim 16, wherein the at least one obstacle is transient.

18. The method of claim 11, further comprising:

receiving an image from the one or more imaging devices;

determining whether the apparatus is present in the image; and recalculating the movement path based, at least in part, on whether the apparatus is determined to be present in the image.

19. A method, comprising:

receiving image capture range information for one or more imaging devices located external to an apparatus;

calculating, by at least one computer processor, a movement path for the apparatus based, at least in part, on the received image capture range information; and controlling a movement device of the apparatus to move the apparatus in accordance with the calculated movement path, wherein at least one of the one or more imaging devices has an image capture range that changes over time, and wherein calculating the movement path for the apparatus is based, at least in part, on a travel speed of the apparatus and the image capture range that changes over time.

20. An apparatus path planning system, comprising:

one or more imaging devices configured to capture images within a space, wherein each of the one or more imaging devices has an image capture range; and an apparatus comprising:

a body and a movement device attached thereto, wherein the body comprises a control unit in communication with the movement device, the control unit comprising at least one processor and a memory configured to store instructions that, when executed by the at least one processor, cause the at least one processor to:

receive, from the one or more imaging devices, image capture range information describing the image capture range of each of the one or more imaging devices, wherein the image capture range information includes a range in which an image can be captured by the one or more imaging devices;

calculate a movement path for the apparatus based, at least in part, on the received image capture range information; and control the movement device to move the apparatus in accordance with the calculated movement path.

* * * * *